US009352591B2

(12) United States Patent
Kim

(10) Patent No.: US 9,352,591 B2
(45) Date of Patent: May 31, 2016

(54) POWER CONVERSION APPARATUS FOR PRINTER

(71) Applicant: SHIN HEUNG PRECISION CO., LTD., Gyeonggi-do (KR)

(72) Inventor: Han Bong Kim, Seoul (KR)

(73) Assignee: SHIN HEUNG PRECISION CO., LTD., Gyeonggi-do (KR)

( * ) Notice: Subject to any disclaimer, the term of this patent is extended or adjusted under 35 U.S.C. 154(b) by 0 days.

(21) Appl. No.: 14/700,184

(22) Filed: Apr. 30, 2015

(65) Prior Publication Data
US 2016/0052306 A1 Feb. 25, 2016

(30) Foreign Application Priority Data

Apr. 30, 2014 (KR) .................. 10-2014-0052613

(51) Int. Cl.
B41J 11/00 (2006.01)
B41J 11/66 (2006.01)
B41J 11/24 (2006.01)
B41J 23/02 (2006.01)
F16H 1/28 (2006.01)

(52) U.S. Cl.
CPC ........ *B41J 11/66* (2013.01); *B41J 11/24* (2013.01); *B41J 23/025* (2013.01); *F16H 1/28* (2013.01)

(58) Field of Classification Search
USPC ......... 347/218, 220–223, 197, 198, 101, 104, 347/106, 14, 16, 17, 171; 400/321, 621.1, 400/633, 636; 83/435
See application file for complete search history.

(56) References Cited

U.S. PATENT DOCUMENTS 8,419,154 B2 * 4/2013 Igarashi ................ B41J 11/003
347/16
2004/0119807 A1 * 6/2004 Fujiwara ............. B41J 11/0005
347/218
2015/0009257 A1 * 1/2015 Endo .......................... B41J 2/32
347/16

FOREIGN PATENT DOCUMENTS

JP 2001-001590 1/2001
KR 10-2004-0061064 9/2005

* cited by examiner

*Primary Examiner* — Kristal Feggins
(74) *Attorney, Agent, or Firm* — Anderson Gorecki & Rouille LLP

(57) ABSTRACT

In one aspect of the present disclosure, a power conversion apparatus comprises a power motor and a power converter configured to selectively convert rotation power of the power motor into a gear train 340 for transferring and a gear train for cutting, respectively, depending on a rotation direction of the power motor. The power converter comprises a sun gear configured to receive power from the power motor, a planetary gear configured to receive a rotating force while being engaged with the sun gear and to selectively couple with the gear train for cutting and the gear train for transferring, respectively, a rotating link configured to constrain a position of the sun gear, and a pressing means configured increase an adhesion between the sun gear and the rotating link.

20 Claims, 21 Drawing Sheets

Prior Art

POWER CONVERSION APPARATUS FOR PRINTER

CROSS-REFERENCE TO RELATED APPLICATIONS

This application claims priority to Korean Patent Application No(s). 10-2014-0052613, filed on Apr. 30, 2014, the disclosure of which is incorporated herein by reference in its entirety.

FIELD OF THE DISCLOSURE

Exemplary embodiments of the present disclosure relate to a power conversion apparatus for a printer, and more particularly, to a power conversion apparatus for a printer capable of minimizing a conversion loss.

DESCRIPTION OF THE RELATED ART

As known, as a recent POS printer, a thermal printer has been mainly used. The thermal printer includes an apparatus for transferring a paper to a portion to be printed and a cutter for cutting a printed sheet.

Generally, most of the existing thermal printers include a power source (e.g., a motor) for transferring a print paper and a power source for cutting a printed paper, respectively, to perform operations of performing printing on the print paper and then cutting the printed portion, respectively, using an individual power source (e.g., a motor).

For example, Korean Patent Laid-Open Publication No. 2009-131630 (Laid-Open Published on Dec. 29, 2009), Korean Patent Publication No. 1246082 (Published on Mar. 21, 2013), Korean Patent Publication No. 1263651 (Published on May 21, 2013), Korean Patent No. 1297646 (Published on Aug. 19, 2013), and so on disclose an embodiment of a printer having a print paper cutter which uses two power motors to perform an operation of transferring a print paper and an operation of cutting a printed paper.

As such, in the case of performing the operation of transferring the print paper and the operation of cutting the printed paper using the two motors, the number of parts is increased as many, and as a result, a size of the apparatus is likely to be increased, and components such as a circuit for driving the individual motors and a gear train are highly likely to be more complex. In particular, the case may work against the goal of implementing miniaturization and simplification of the printer.

Therefore, better methods for performing the operation of transferring print paper and the operation of cutting printed paper in the printer have been researched, developed, and disclosed.

For example, Korean Utility Model No. 0083282 (Published on Jun. 15, 1994), Japanese Patent Laid-Open Publication No. 2001-1590 (Laid-open published on Jan. 19, 2001), Japanese Patent Publication No. 3496713 (Registered on Nov. 28, 2003), Korean Patent Publication No. 0517839 (Published on Oct. 4, 2005), and so on disclose a technology of performing an operation of transferring a print paper and an operation of cutting a printed paper using a single motor in a facsimile and a printer.

Among the related art documents, a cutter for cutting a recording paper in a facsimile as disclosed in Korean Utility Model No. 0083282 is illustrated in FIG. 1.

As illustrated in FIG. 1, in the cutter for cutting recording paper, a power transfer means 1 is configured to include a motor 2 for transferring recording paper, a pinion 3 fixed to a shaft of the motor 2, a power transfer gear 4 engaged with the pinion 3, a driving lever 5 connected between the pinion 3 and the power transfer gear 4, a reduction gear 6 installed at a position where it may be selectively engaged with the power transfer gear 4, and a cutter driving gear 7 engaged with the reduction gear 6, in which the other side of the reduction gear 6 is engaged with an idle gear 18 while being fixed with a platen gear 19 for driving a platen 20.

Therefore, when the motor 2 rotates counterclockwise in FIG. 1, the power transfer gear 4 connected to the pinion 3 by the driving lever 5 is connected to the idle gear 18 by moving the pinion 3 in a rotation direction due to a friction driving force between the pinion 3 and the power transfer gear 4, such that the driving force of the motor 2 is transferred to the platen 20 through the idle gear 18 and the platen gear 19 and the recording paper is transferred between a print head 21 and the platen 20.

Further, when the motor 2 rotates clockwise, the power transfer gear 4 is connected to the reduction gear 6 and thus the driving force of the motor 2 is transferred to the cutter driving gear 7 through the reduction gear 6.

In this case, the cutter driver 8 is configured to include a driving cam 9 integrally fixed to the cutter driving gear 7, a connection roller 11 connected to the driving cam 9 while being installed at one side of a lower cutter 10, a torsion spring 14 applying a force to the lower cutter 10 downwardly all the times, and a hinge pin 13 which is a rotation center of the lower cutter 10, where the torsion spring 14 is coupled with a spring hook 12 formed at one side of the lower cutter 10 and a protrusion 15 formed at a main body and the hinge pin 13 is coupled with a hinge hole.

Therefore, when a larger radius portion of the driving cam 9 is connected to the connection roller 11 due to a rotation of the cutter driving gear 7, the lower cutter 10 is engaged with an upper cutter 17 when the lower cutter 10 rotates upwardly using the hinge pin 13 as an axis and cut a recording paper 23. Then when a smaller radius portion of the driving cap 9 is connected to the connection roller 11, the lower cutter 10 returns to the position it had taken prior to the operation by the force and self-load of the torsion spring 14.

As such, the power transfer gear 4 and the driving lever 5 rotate by a pinion gear 3 directly connected to a shaft end of the motor 2 according to the rotation direction of the motor 2 to change a power transfer so as to selectively transfer power to a transfer mechanism for a recording paper and a cutting mechanism for the recording paper. Thus, the transfer mechanism of recording paper and the cutting mechanism of recording paper may be selectively operated by a single motor, and thus the cutting mechanism may be independently operated.

However, for the power conversion structure as described above, revolution counts of the motor 2 may be generated to move the power transfer gear 4 without the occurrence of any actual power transfer during the power transfer stage, and therefore there is a need to reduce the revolution counts of the motor for the power conversion.

In particular, a slip phenomenon may occur on a friction surface of the power conversion portion due to abrasion, etc., at the fastened contact portion depending on the effect of a self load of the power transfer gear 4 and the driving lever 5 as well as a friction condition of each part, thus causing a deviation in the revolution counts of the motor for the power conversion. As the friction condition is gradually varied due to the long-term use of the printer mechanism, the deviation in the revolution counts of the motor for the power conversion may become much larger accordingly.

SUMMARY OF THE DISCLOSURE

Objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In one aspect of the present disclosure, a power conversion apparatus for a printer, where the printer includes a body casing, a cover frame, a printer head unit with a gear train for transferring print paper, a gear train for cutting printed paper, and a cutter for cutting printed paper, and a platen roller unit, comprises a power motor and a power converter configured to selectively convert rotation power of the power motor into the gear train for transferring and the gear train for cutting, respectively, depending on a rotation direction of the power motor. The power converter comprises a sun gear configured to receive power from the power motor, a planetary gear configured to receive a rotating force while being engaged with the sun gear and to selectively couple with the gear train for cutting and the gear train for transferring, respectively, a rotating link configured to constrain a position of the planetary gear, and a pressing means configured to increase an adhesion between the sun gear and the rotating link.

In various embodiments of the present disclosure, the rotating link of the power converter is protrudedly formed with a rotating shaft part coupled with the sun gear and a gear shaft part coupled with the planetary gear. The pressing means is inserted between the sun gear and the rotating shaft part of the rotating link. The pressing means is inserted between the planetary gear and the gear shaft part of the rotating link. The pressing means comprises semi-arch shaped bushes formed in a pair to face each other and the semi-arch shaped bushes configured to be inserted between the rotating shaft part of the rotating link and the sun gear, and a spring member configured to be mounted in a long-hole concave groove formed on an outer circumferential surface of the bushes.

In various embodiments of the present disclosure, the pressing means further comprises a bush protrusion formed at one end of the bushes to be inserted into a protrusion insertion groove formed on the rotating link. The pressing means comprises semi-arch shaped bushes formed in a pair to face each other and the semi-arc shaped bushes configured to be inserted between the gear shaft part of the rotating link and the planetary gear, and a spring member configured to be mounted in a long-hole concave groove formed on an outer circumferential surface of the bushes. The pressing means further comprises: a bush protrusion formed at one end of the bushes and the bush protrusion configured to be inserted into a protrusion insertion groove formed on the rotating link. The pressing means is a pressing member having a coil spring form.

In various embodiments of the present disclosure, the gear train for cutting comprises a first driven gear configured to be disposed on one side of a support frame so as to be engaged with the planetary gear, a bevel gear comprising a ring gear forming a pair with a pinion gear disposed at the other end of a driven shaft, wherein the driven shaft is connected to the first driven gear and is horizontally disposed at a central portion inside the support frame, and a crank gear configured to be geared with the ring gear of the bevel gear and connected to an operating guide by which an operating blade of the cutter for cutting printed paper slidably moves up and down. The gear train for transferring comprises a second driven gear configured to be engaged with the planetary gear by moving a position of the planetary gear based on the sun gear, and a platen gear configured to be disposed at one end of a platen roller while being engaged with the second driven gear.

In various embodiment of the present disclosure, the cutter for cutting printed paper comprises an operating blade configured to slidably move up and down while being supported by and fixed to an operating guide which is mounted to slidably move up and down in response to a driving force of the power motor through the gear train for cutting inside the support frame, and a fixed blade configured to be vertically supported and fixed on a whole surface of the platen roller unit so as to cut the printed paper in a cross cooperation with the operation blade slidably moving up and down. The planetary gear comprises a first large gear configured to be engaged with the sun gear and a first small gear configured to be selectively engaged with the first driven gear and the second driven gear. The power conversion gear of the power converter comprises a gear structure with a second large gear engaged with a driving gear of the power motor and a second small gear selectively engaged with the first driven gear of the gear train for cutting and the second driven gear of the gear train for transferring. The power converter further comprises a washer configured to be installed at an end of the gear shaft part to prevent the pressing member from separating.

In another aspect of the present disclosure, a power conversion apparatus for a printer, which includes a body casing, a cover frame, a printer head unit with a gear train for transferring print paper, a gear train for cutting printed paper, and a cutter for cutting printed paper, and a platen roller unit, comprises a power motor and a power converter configured to selectively convert rotation power of the power motor into the gear train for transferring and the gear train for cutting, respectively, depending on a rotation direction of the power motor. The power converter comprises a sun gear configured to receive power from the power motor, a planetary gear configured to receive a rotating force while being engaged with the sun gear and to selectively couple with the gear train for cutting and the gear train for transferring, respectively, a rotating link configured to constrain a position of the planetary gear, and a pressing means configured to increase an adhesion between the planetary gear and the rotating link.

In yet another aspect of the present disclosure, a power conversion apparatus for a printer, which includes a body casing, a cover frame, a printer head unit with a gear train for transferring print paper, a gear train for cutting printed paper, and a cutter for cutting printed paper, and a platen roller unit, comprises a power motor, a first power converter configured to selectively convert rotation power of the power motor into the gear train for transferring and the gear train for cutting, respectively, depending on a rotation direction of the power motor, and a second power converter configured to selectively convert rotation power of the power motor into the gear train for transferring and the gear train for cutting, respectively, depending on a rotation direction of the power motor. The second power converter comprises a power conversion gear, a rotating link comprising a gear shaft part fitted with the power conversion gear and a central shaft part aligned based on a driving shaft of the power motor, and a pressing member configured to be inserted into an assembled portion of the gear shaft part of the rotating link and the power conversion gear.

In various embodiments of the present disclosure, the gear train for cutting comprises a first driven gear configured to be disposed on one side of a support frame so as to be engaged with the planetary gear, a bevel gear comprising a ring gear forming a pair with a pinion gear disposed at the other end of a driven shaft, wherein the driven shaft is connected to the first driven gear and is horizontally disposed at a central portion inside the support frame and a crank gear configured to be geared with the ring gear of the bevel gear and connected to an operating guide by which an operating blade of the cutter for cutting printed paper slidably moves up and down. The gear train for transferring comprises a second driven gear configured to be engaged with the planetary gear by moving a position of the planetary gear based on the sun gear, and a platen gear disposed at one end of a platen roller while being engaged with the second driven gear. The cutter for cutting printed paper comprises an operating blade configured to slidably move up and down while being supported by and fixed to an operating guide which is mounted to slidably move up and down in response to a driving force of the power motor through the gear train for cutting inside the support frame, and a fixed blade configured to be vertically supported and fixed on a whole surface of the platen roller unit so as to cut the printed paper in a cross cooperation with the operation blade slidably moving.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which.

Figure 1:
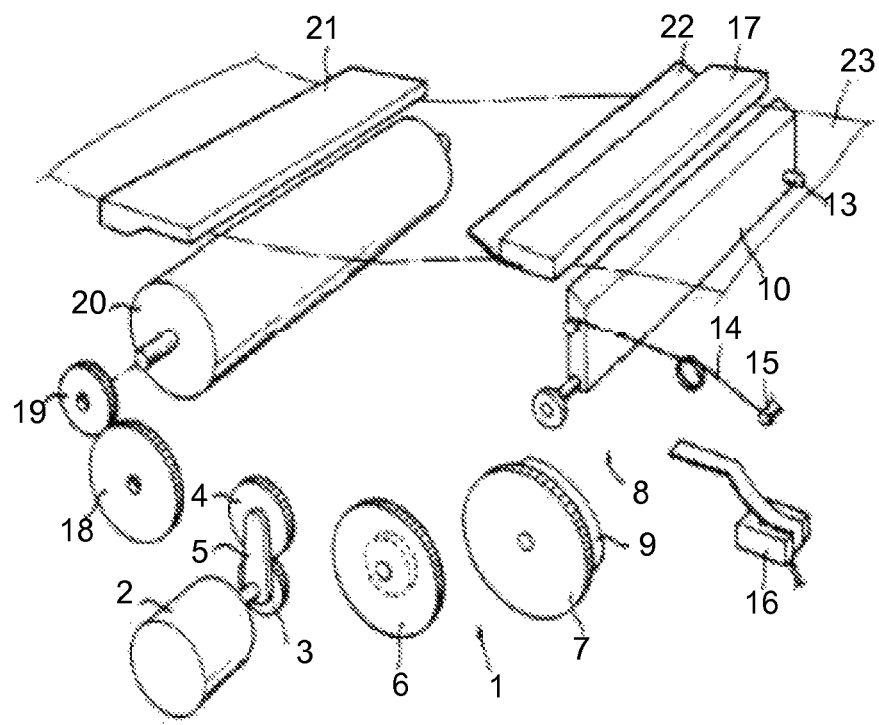
FIG. 1 is a perspective view of a cutter for cutting recording paper.

Other features of the present embodiments will be apparent from the accompanying drawings and from the detailed description that follows.

DESCRIPTION OF SPECIFIC EMBODIMENTS

Detailed exemplary embodiments of the present disclosure will be described with reference to the accompanying drawings. The present disclosure may be modified in various ways and implemented by various exemplary embodiments, so that specific exemplary embodiments are illustrated in the drawings and will be described in detail below. However, it is to be understood that the present disclosure is not limited to the specific exemplary embodiments, but includes all modifications, equivalents, and substitutions included in the spirit and the scope of the present disclosure. Hereinafter, exemplary embodiments of the present disclosure will be described in detail with reference to the accompanying drawings.

In this case, a thickness of lines, a size of components, or the like illustrated in the accompanying drawings for describing the exemplary embodiments of the present disclosure may be exaggerated or omitted for clarity and convenience of description and terms denoted by reference numerals of the drawings are defined in consideration of functions of the present disclosure, which may be changed depending on an operator's intention or a practice.

Figure 2:
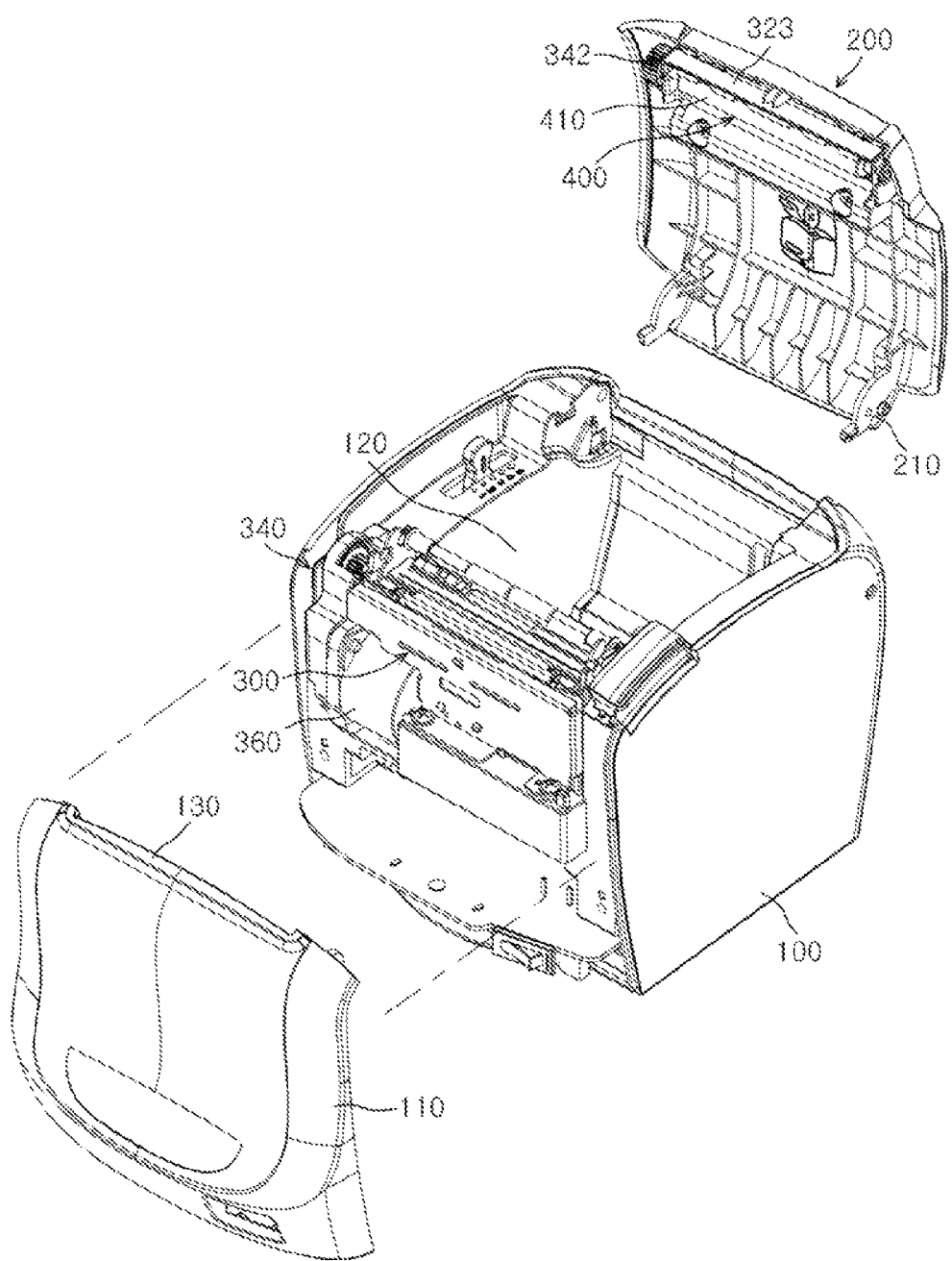
FIG. 2 is a perspective view illustrating the whole configuration of a printer according to an exemplary embodiment of the present disclosure.
Figure 3:
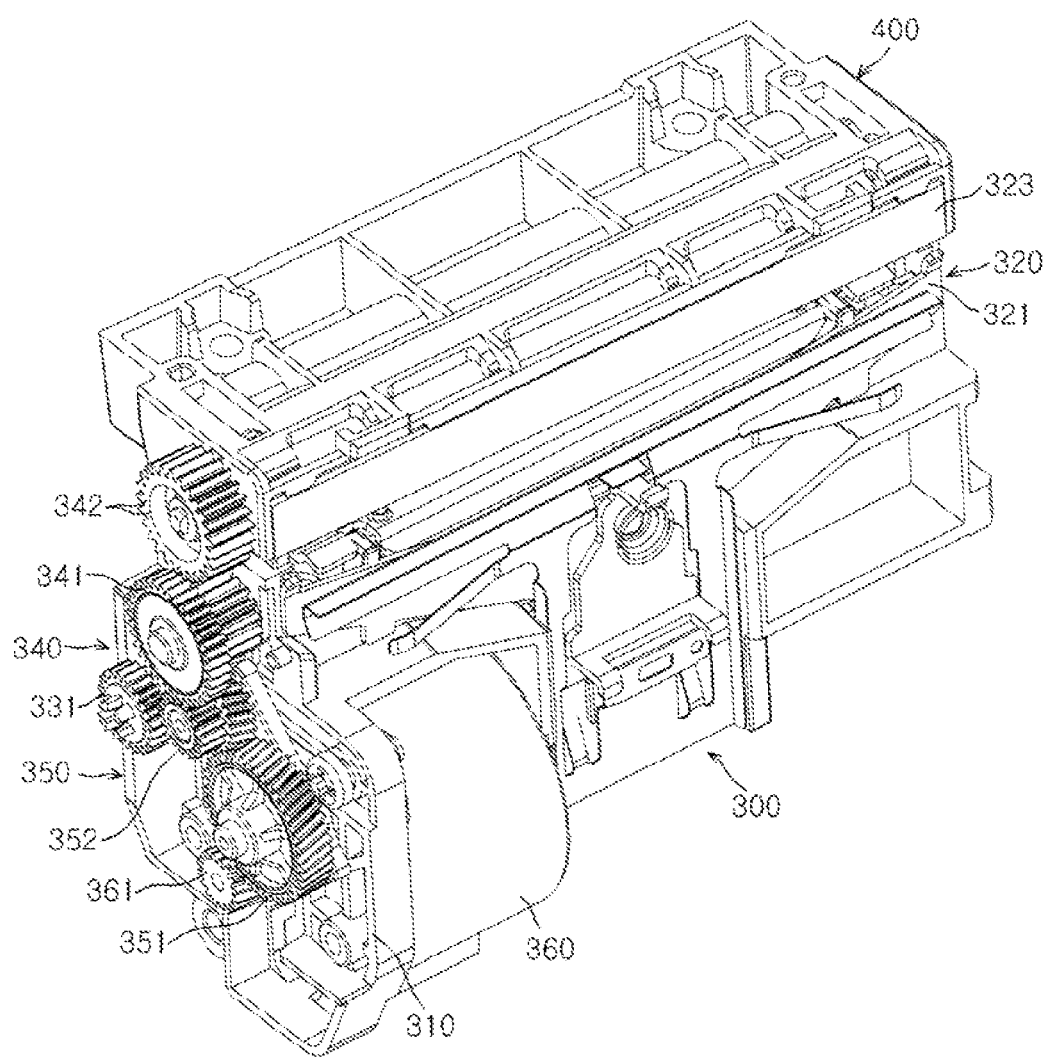
FIG. 3 is a perspective view illustrating a state in which a printer head unit and a platen roller unit are engaged with each other in a state in which a body casing and a cover frame are removed from a printer according to the exemplary embodiment of the present disclosure.

As illustrated in FIGS. 1 to 3, a thermal printer according to an exemplary embodiment of the present disclosure is configured to include a body casing 100 and a cover frame 200. A printer head unit 300 for printing is mounted in the body casing 100. The cover frame 200 is open by rotating based on a rotating part which is provided on a rear upper surface of the body casing 100. Further, a platen roller unit 400 is mounted on the cover frame 200 while facing the printer head unit 300.

The body casing 100 is a casing molded using plastic or metal materials and a front surface thereof is separated into a front cover 110 and an upper surface thereof has an empty box shape which is open through the cover frame 200. An inside of the body casing 100 is mounted with a mounting part 120 for mounting printed pager P (not illustrated). The mounting part 120 is formed to fit roll-shaped printed paper and is configured to stably mount the roll-shaped printed paper. In this case, a front of the mounting part 120 is mounted with the printer head unit 300. An upper outer circumferential surface to which the front cover 110 and a leading end of the cover frame 200 contact is provided with a print page drawing port 130. The print paper is drawn from the inside of the body casing 100 through the print paper drawing port 130.

As illustrated in FIGS. 1 and 2, the platen roller unit 400 is combined with the printer head unit 300 when the cover frame 200 is opened and is separated from the printer header unit 300 when the cover frame 200 is closed. That is, when the cover frame 200 is closed on an upper surface of the body casing 100, the printer head unit 300 and the platen roller unit 400 are combined to face each other. The platen roller unit 400 is configured to rotatably support a platen roller 410 made of elastomer like rubber and the like to feed print paper and is vertically provided with respect to a fixed blade 323 which is used to form a cutter 320 for cutting printed paper to be described below.

One end of the platen roller 410 is fixed in the state in which a platen gear 342 is connected to a shaft part. The platen gear 342 of one side of the platen roller 410 transfers a rotating force by being engaged with the gear train 340 for transferring to be described below. In this configuration, the platen roller 410 is configured to rotate by a rotating force transferred from the gear train 340 for transferring to feed the print paper to the outside of the body casing 100 through the print paper drawing port 130.

As illustrated in FIGS. 2 and 3, components for printing print paper and components of the cutter 320 for cutting printed paper the printer head unit 300 are organically disposed in the printer head unit 300. The printer head unit 300 is provided with a support frame 310 in which a thermal printer head (not illustrated) for performing recording on the drawn print paper is mounted, an operating blade 321 slidably moving to the fixed blade 323 configuring the cutter 320 for cutting printed paper, a gear train 330 for cutting for driving the operating blade 321, and a gear train 340 for transferring for driving the platen roller 410. The support frame 310 is a portion where a frame of the printer head unit 300 is formed and a side and a central portion thereof each are organically mounted with gear trains configured of the gear train 330 for cutting and the gear train 340 for transferring. Further, one side therein is provided with the cutter 320 for cutting print paper which is configured of the operating blade 321 and the fixed blade 323 which are disposed to interlock with the gear train 330 for cutting. In addition, the support frame 310 includes a single power motor 360 which may selectively provide a driving force to the gear train 330 for cutting and the gear train 340 for transferring.

Figure 5:
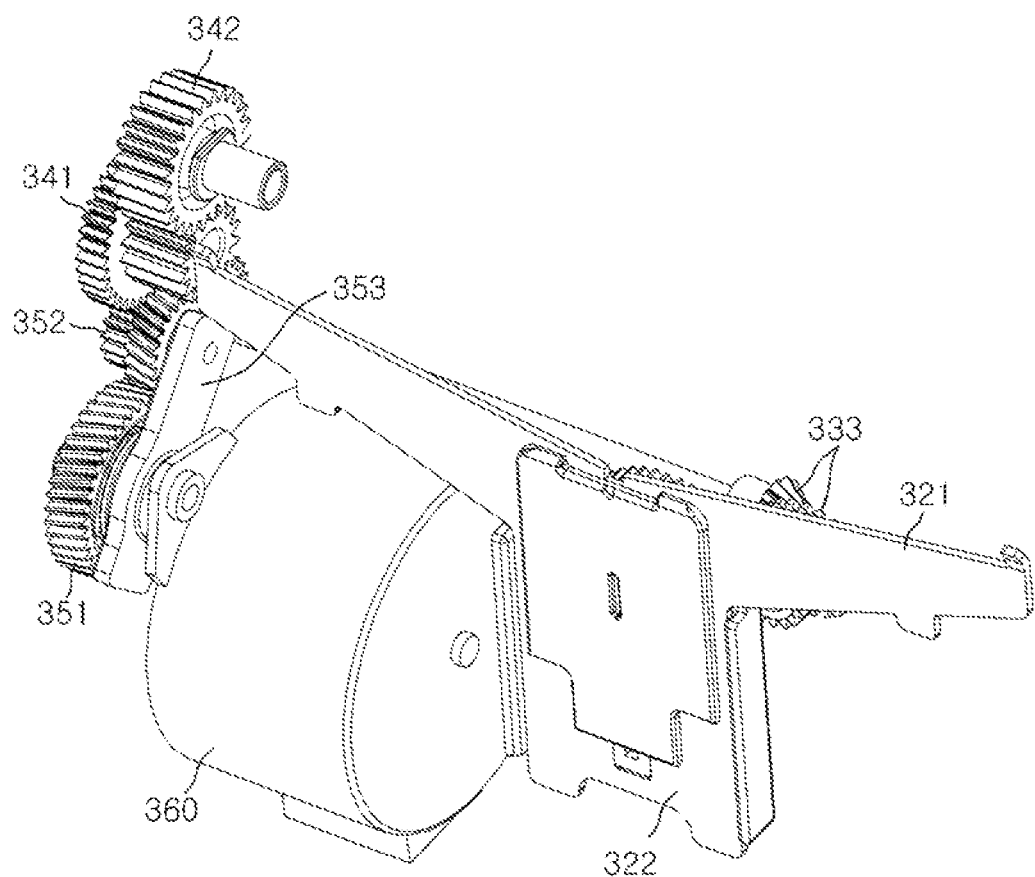
FIGS. 5 to 7 are perspective views of main parts illustrating a configuration of a gear train for cutting and a gear train for transferring in the printer according to the exemplary embodiment of the present disclosure when making a viewing direction different.

In this configuration, the present disclosure is characterized in that the gear train 330 for cutting and the gear train 340 for transferring may selectively provide a driving force from the single power motor 360 through the power converter 350. That is, as illustrated in FIG. 5, one side of an inner wall of the support frame 310 is provided with the power motor 360 generating the driving force and the gear train 330 for cutting and the gear train 340 for transferring are disposed on one side of the support frame 310 in the gear train to be adjacently disposed to each other so as to be supplied with selectively power from the power motor 360. In particular, the power converter 350 according to a first exemplary embodiment of the present disclosure is configured to include a sun gear 351 engaged with the driving gear 361 of the power motor 360 and a planetary gear 352 engaged with the sun gear 351 while being connected by a rotating link 353 based on the sun gear 351.

A detailed assembling configuration of the power converter 350 will be described below. First, the cutter 320 for cutting printed paper, the gear train 330 for cutting, and the gear train 340 for transferring will be first described below. The cutter 320 for cutting printed paper is configured to include the operating blade 321 and the fixed blade 323 and is operated by being supplied with the driving force of the driving motor 360 through the gear train 330 for cutting.

Figure 4:
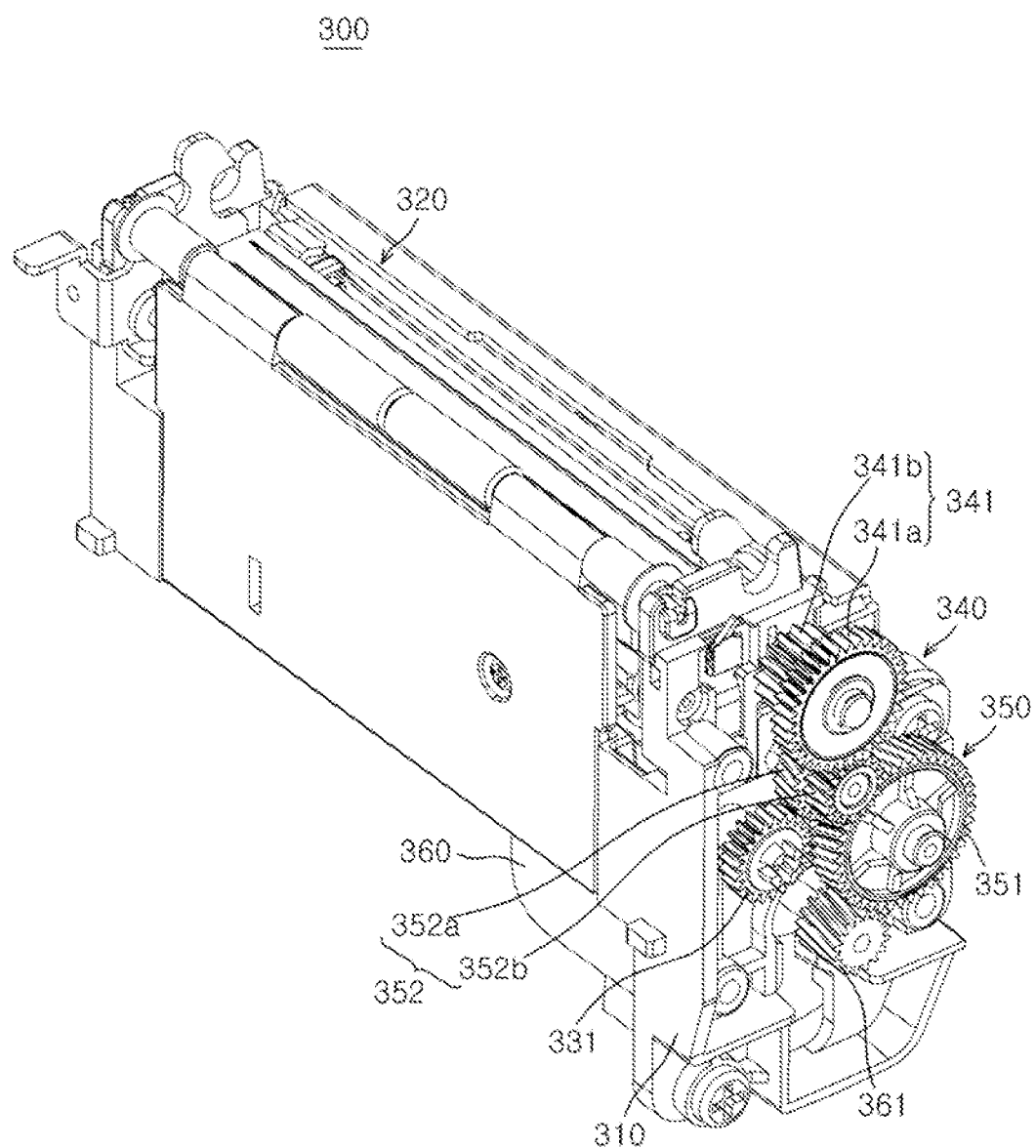
FIG. 4 is a perspective view illustrating a configuration of the printer head unit in the printer according to the exemplary embodiment of the present disclosure.
Figure 6:
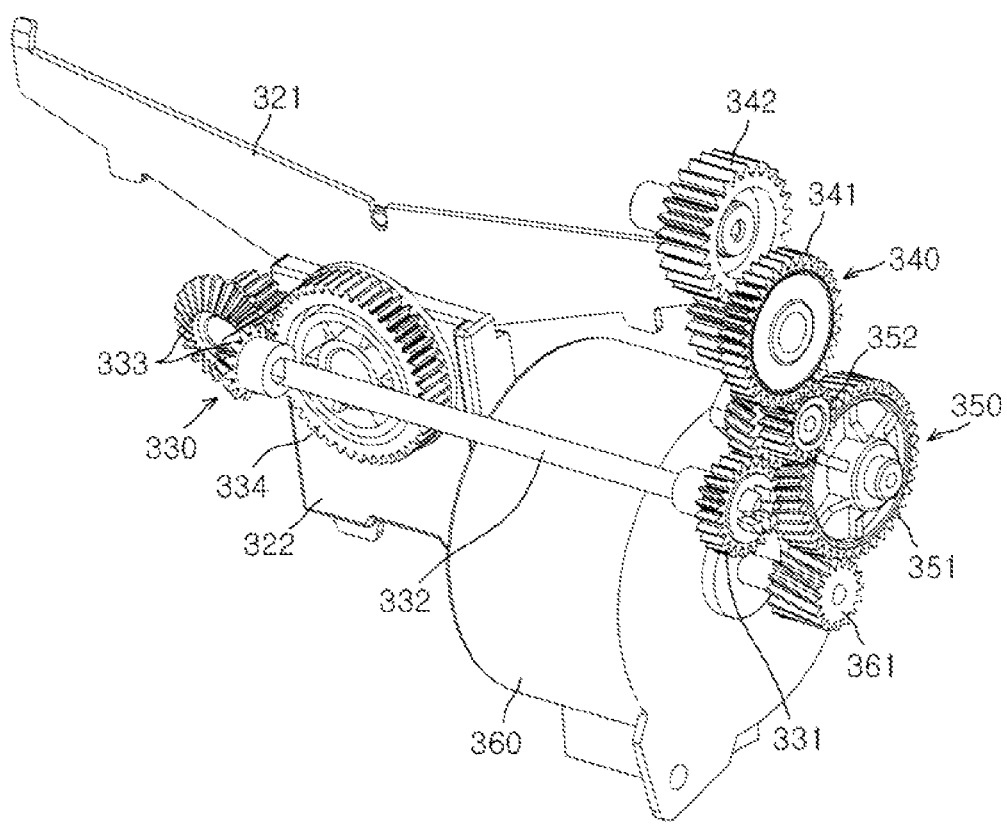
Figure 7:
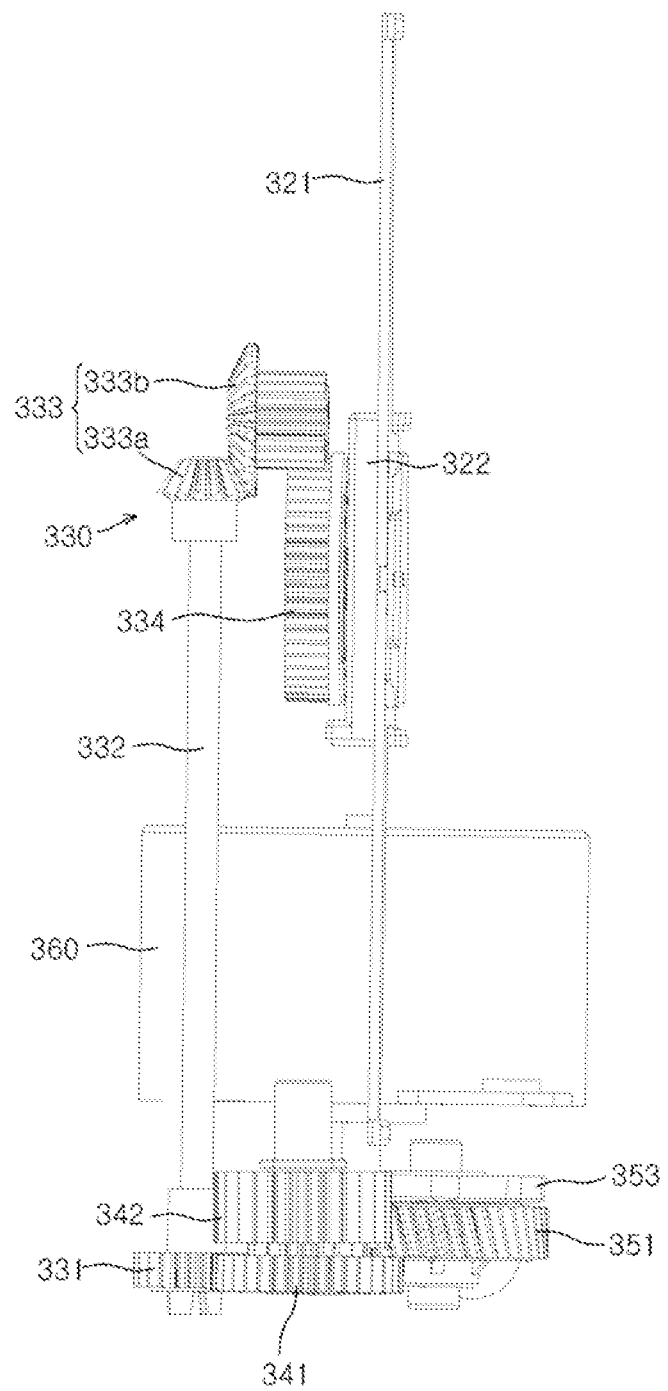
Figure 8:
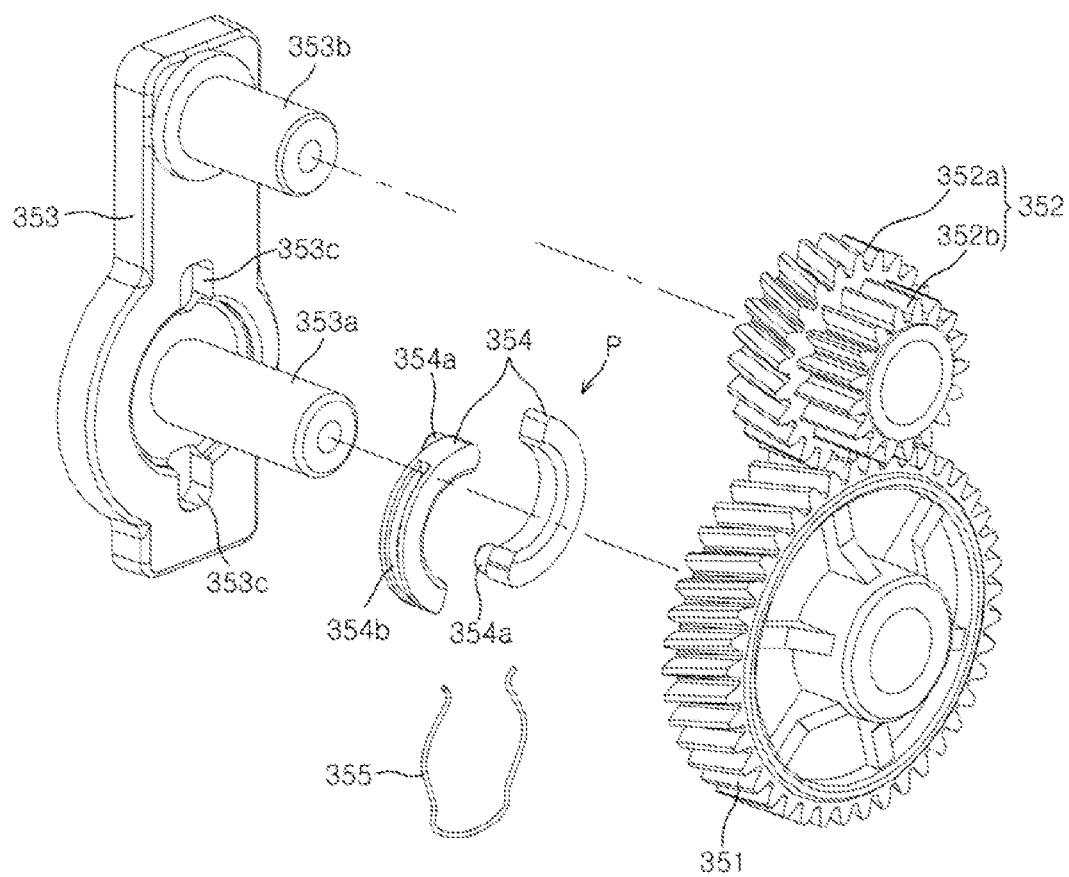
FIGS. 8 to 11 are exploded perspective view and a coupled perspective view of main parts illustrating a configuration of a power converter according to a first exemplary embodiment of the present disclosure.
Figure 9:
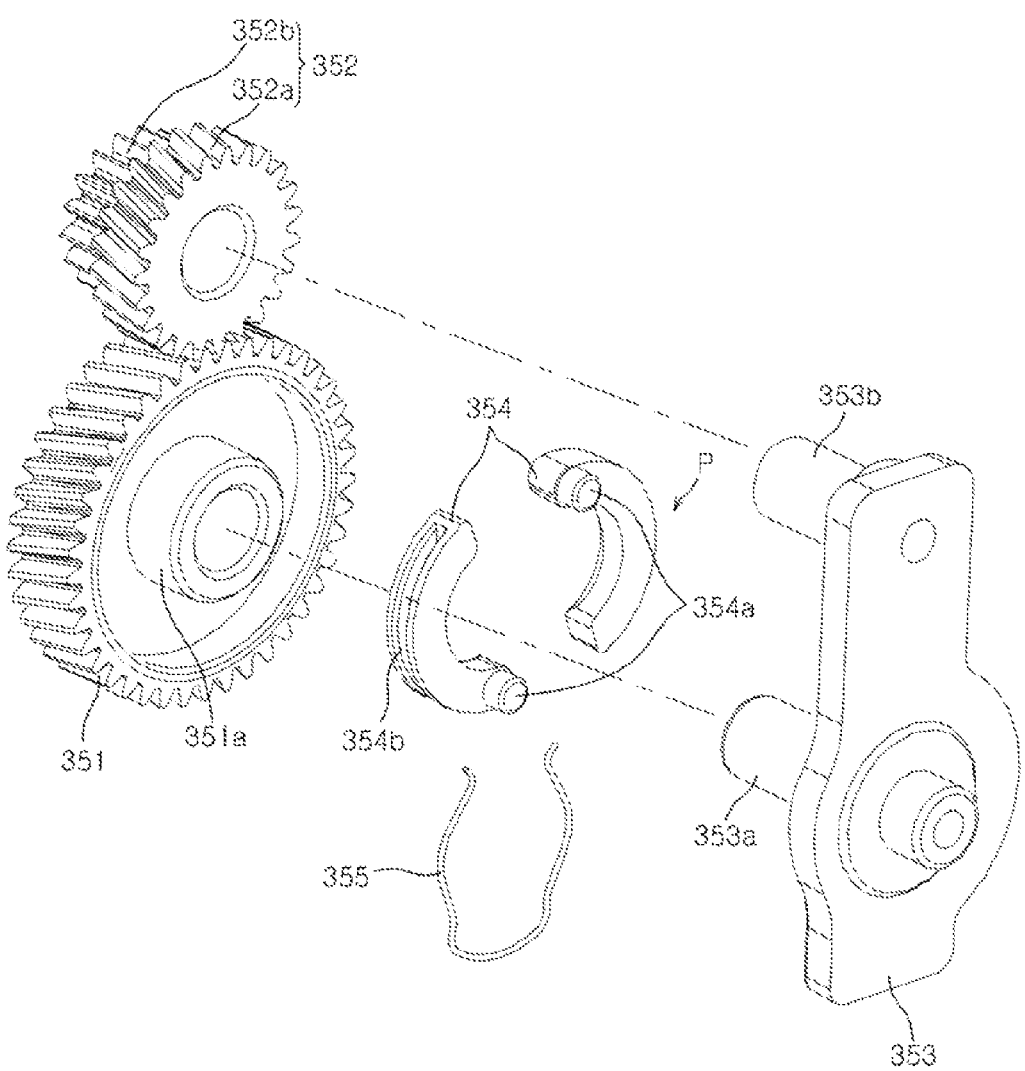
Figure 10:
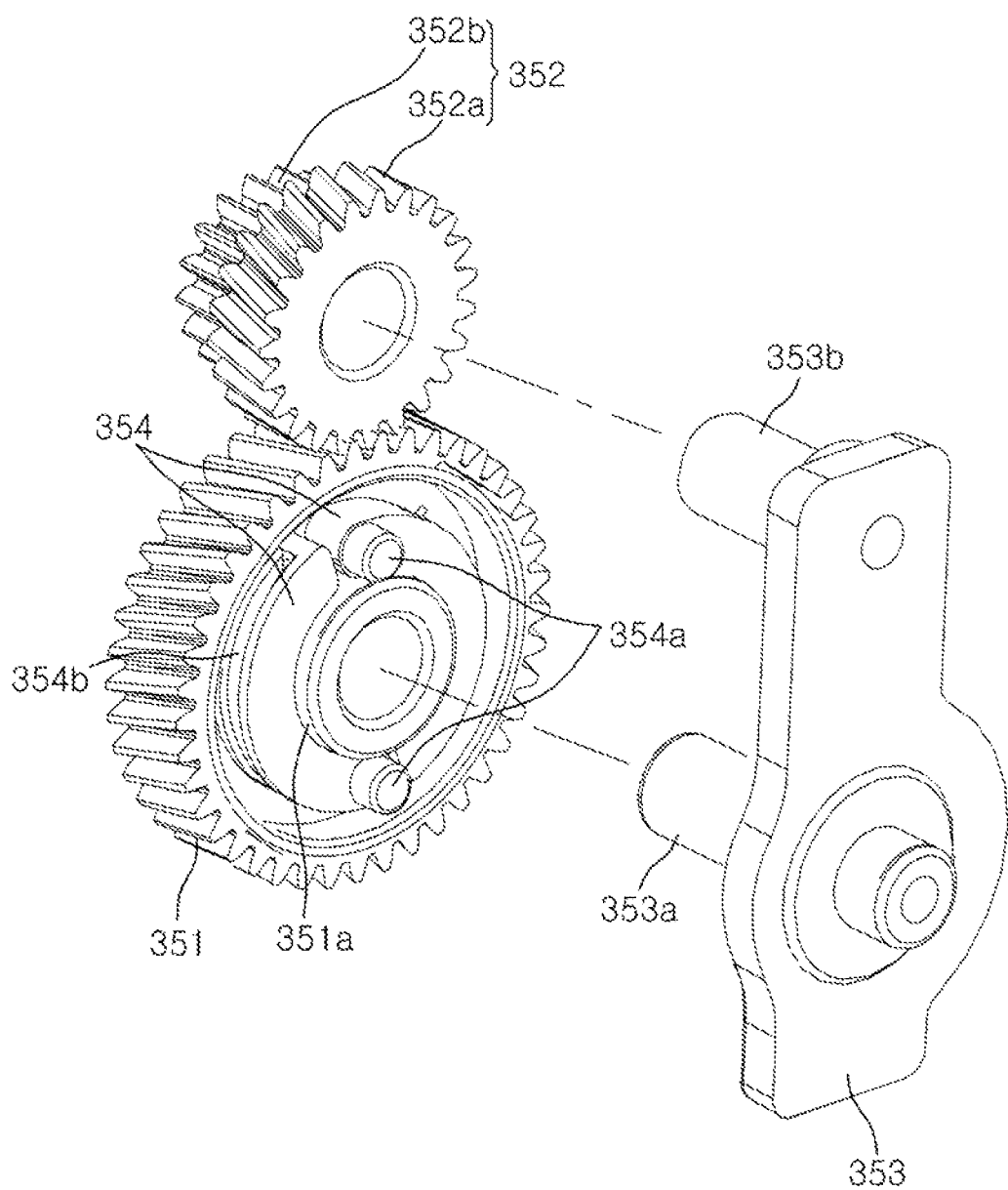

As illustrated in FIGS. 4 to 6, the operating blade 321 is a V-letter plate-shaped blade when viewed from an upper surface on which a length from a rear end of the operating blade 321 to an edge is gradually short toward a center from both ends thereof. That is, the operating blade 321 is a component of the cutter 320 for cutting printed paper and serves as a cutter in cooperation with the fixed blade 323 and is mounted inside the support frame 310 to slidably move up and down through an operating guide 322. The fixed blade 323 is a blade serving to cut the printed paper in a cross cooperation with the operating blade 321 and as illustrated in FIGS. 1 and 2, is a plate-shaped blade extending in a width direction of the printed paper. When the cover frame 200 is closed, a tip of the fixed blade is vertically supported and fixed on the whole surface of the platen roller unit 400 so as to be opposite to the fed printed paper. Therefore, when power is sequentially transferred through the gear train 330 for cutting, the operating blade 321 slidably moving up and down crosses the fixed blade 323 vertically supported and fixed on the whole surface of the platen roller unit 400 to cut the printed paper.

As illustrated in FIGS. 4 to 6, the gear train 330 for cutting is configured of a combination of gears for transferring the driving force of the power motor 360, which provides the driving force for driving the operating blade 321, to the operating blade 321. The gear train 330 for cutting is disposed to be engaged with the planetary gear 352 of the power converter 350 and thus may control the driving force based on the gear coupling with the planetary gear 352. As illustrated in FIGS. 4 and 5, the gear train 330 for cutting is configured to include a first driven gear 331 disposed on one side of the support frame 310 to engage the planetary gear 352 of the power converter 350, a bevel gear 333 configured to include a ring gear 333b forming a pair with a pinion gear 333a disposed at the other end of the driven shaft 332 which is connected to the first driven gear 331 and is horizontally disposed at a central portion inside the support frame 310, and a crank gear 334 configured to be geared with the ring gear 333b of the bevel gear 333.

The crank gear 334 is connected to the operating guide 332 by which the operating blade 321 guides a vertically slide movement and the operating guide 322 is connected and assembled to slidably move up and down depending on the rotation of the crank gear 334.

As illustrated in FIGS. 4 to 6 and 13, the driving gear 361 integrally assembled on the driving shaft of the power motor 360 is engaged with the sun gear 351 of the power converter 350, the planetary gear 352 geared with the sun gear 351 while being connected by the rotating link 353 based on the sun gear 351 is engaged with the first driven gear 331 while moving toward the first driven gear 331, the bevel gear 333 is rotatably connected through the driven shaft 332 connected to the first driven gear 331, and the ring gear 333b of the bevel gear 333 maintains a geared state with the crank gear 334. As the gear coupling of the gear train 330 for cutting is made, the driving force of the power motor 360 is transferred up to the crank gear 334 to operate the operating guide 322, and thus the driving transferred to the operating blade 321 is sequentially made. The gear train 340 for transferring is a combination of gears for transferring the driving force of the power motor 360 providing the driving force for driving the platen roller 410 toward the platen roller 410. Print paper surface-contacting the platen roller 410 is fed by allowing the gear train 340 for transferring to rotate the platen roller 410.

As illustrated in FIGS. 1 to 6, the gear train 340 for transferring is disposed on one side of the support frame 310 to be engaged with the platen gear 342 disposed on a shaft port of one side of the platen roller 410, thereby controlling the power. As illustrated in FIGS. 4 to 6, the gear train 340 for transferring includes a second driven gear 341 configured to be disposed on one side of the support frame 310 so as to be engaged with the planetary gear 352 by moving a position of the planetary gear 352 based on the sun gear 351; and a platen gear 342 configured to be disposed at one end of a platen roller 410 while being engaged with the second driven gear 341. The second driven gear 341 is formed to have a gear structure which may be made in a double gear coupling in which a large gear 341a and a small gear 341b are configured. Therefore, the large gear 341a of the second driven gear 341 is disposed to be engaged with the small gear 352b of the planetary gear 352 and the small gear 341b of the second driven gear 341 is disposed to be engaged with the platen gear 342. The platen gear 342 is installed at one side of the platen roller 410 while taking a spur gear to serve to be supplied with the driving force which may rotate the platen roller 410.

Figure 11:
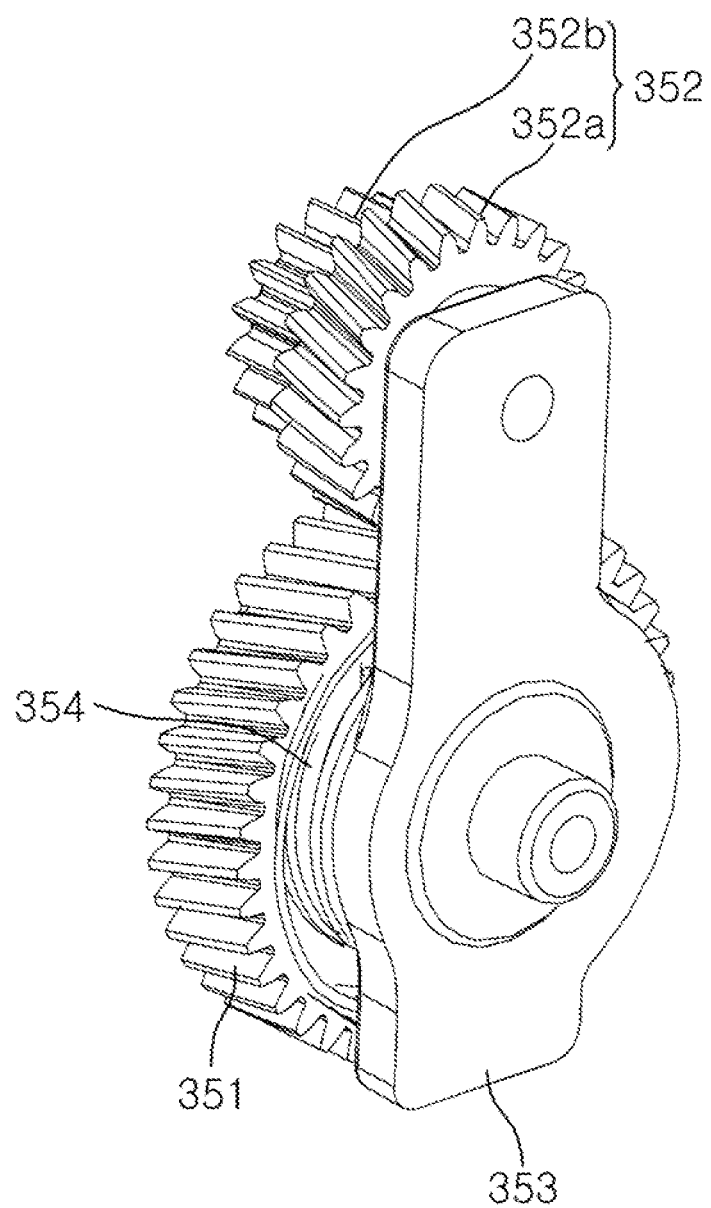

As illustrated in FIGS. 1 and 2, when the printer head unit 300 and the platen roller unit 400 are combined with each other, the platen gear 342 and the smaller gear 341b of the second driven gear 341 are geared with each other and thus maintain the engaged state. Further, as illustrated in FIG. 11, the position of the planetary gear 352 of the power converter 350 moves based on the sun gear 351 and thus the planetary gear 352 is engaged with the second driven gear 341 to implement the gear coupling of the gear train 340 so as to transfer the power of the power motor 360 to the platen roller 410, thereby sequentially transferring the driving force. Meanwhile, as described above, the present disclosure is characterized in that the driving force from the single power motor 360 may be selectively provided to the gear train 330 for cutting and the gear train 340 for transferring through the power converter 350. Further, when the power conversion is selectively performed, a conversion loss of the power converter 350 may be minimized and the effect of the friction and the self load thereof may be minimized.

Hereinafter, each embodiment of a method for minimizing a conversion loss of the power converter and an affect of a friction and a self load of gears of the power conversion will be described below.

As illustrated in FIGS. 7 to 10, the power converter 350 according to the first exemplary embodiment of the present disclosure is a converter for converting power depending on a rotation direction of the power motor 360 and is configured to include the sun gear 351 directly supplied with power from the driving gear 361 which is directly connected to an end of the power motor 360, the planetary gear 352 supplied with the rotating force while being engaged with the sun gear 351, and the rotating link 353 for constraining the positions of the sun gear 351 and the planetary gear 352.

The planetary gear 352 has a geared structure in which a large gear 352a engaged with the sun gear 351 and a small gear 352b selectively engaged with the first driven gear 331 of the gear train 330 for cutting and the second driven gear 341 of the gear train 340 for transferring are integrally formed. The rotating link 353 has a structure in which a rotating shaft part 353a and a gear shaft part 353b are formed to be horizontally protrude so as to be fitted in centers of the sun gear 351 and the planetary gear 352, respectively. In other words, the center of the sun gear 351 is fitted in the rotating shaft part 353a of the rotating link 353 and the center of the planetary gear 352 is fitted in the gear shaft part 353b of the rotating link 353 to allow the rotating link 353 to constantly constrain the position in the state in which the sun gear 351 and the planetary gear 352 are geared with each other.

Figure 12:
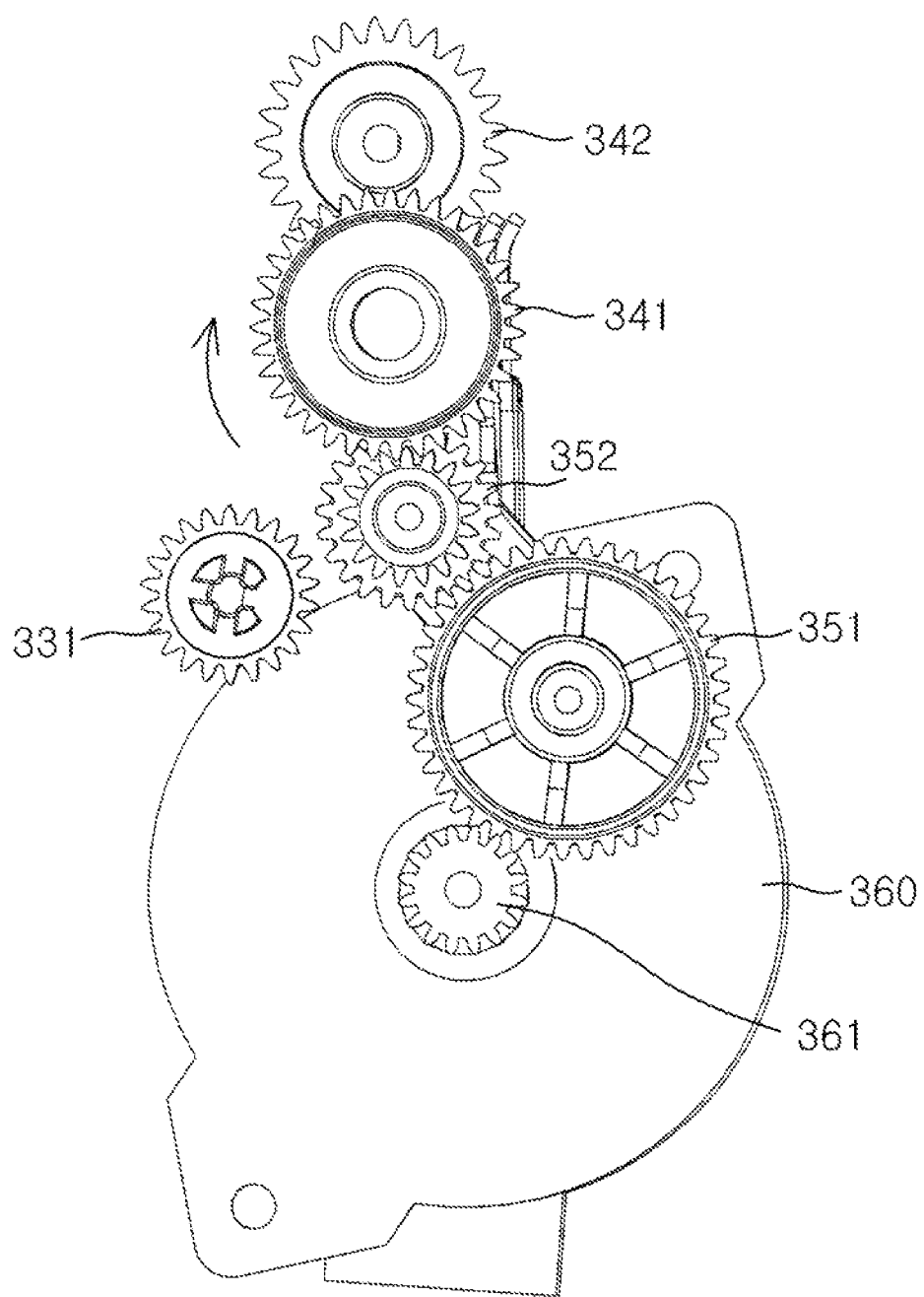
FIG. 12 is an operation state diagram illustrating a state in which a planetary gear of the power converter according to the first exemplary embodiment of the present disclosure is engaged with a second driven gear of the gear train for transferring.

In this configuration, the sun gear 351 is assembled with the rotating shaft part 353a on the rotating link 353 and an opposite side of the rotating shaft part 353a of the rotating link 353 is rotatably installed on the support frame 310 based on the rotating shaft part 353a. The planetary gear 352 which forms a pair with the sun gear 351 is assembled on a separate gear shaft part 353b on the rotating link 353 and thus is installed to robustly transfer the rotating power all the times, together with the sun gear 351. In particular, the sun gear 351 is engaged with the driving gear 361 of the power motor 360 and thus rotates forward or reversely depending on the rotating direction and the rotating link 353 naturally changes the position of the planetary gear 352 while rotating based on the sun gear 351 depending on a forward or reverse direction of the sun gear 351. Therefore, as illustrated in FIGS. 11 and 12, the position of the planetary gear 352 moves and thus a power transfer direction is converted while being selectively geared with the gear train 330 for cutting and the gear train 340 for transferring, respectively.

In this case, to smoothly rotate the rotating link 353 in the rotation direction of the sun gear 351 in a relative sliding motion between the sun gear 351 and the rotating link 353, a pressing means P for increasing an adhesion is inserted between the rotating shaft part 353a of the rotating link 353 and the sun gear 351. Here, according to the exemplary embodiment of the present disclosure, the pressing means P is configured to include a bush 354 and a spring member 355. The bush 354 has a semi-arc structure and is disposed at a position where two bushes 354 face each other to be disposed between the sung gear 351 and the rotating shaft part 353a while forming a pair in a circular structure. Further, an outer side of the semi-arc bush 354 is provided with a long-hole concave groove 354b, the concave groove 354b is inserted with a U-letter spring member 355 for constantly maintaining a friction force between a friction surface 351a of the sun gear 351 and a friction surface of the bush 354.

The U-letter spring member 355 serves to increase an adhesion by an action of pressing the friction surface of the bush 354 in a direction of the friction surface 351a. Further, one end of the bush 354 is provided with a bush protrusion 354a and thus is assembled to be coupled with a protrusion insertion groove 353c formed on the rotating link 353. That is, the bush protrusion 354a positioned on one side of the bush 354 is inserted into the protrusion insertion groove 353c positioned on the rotating link 353 and serves as a position fixing structure to constrain the relative rotating motion. Therefore, the bush 354 generates a rotating force rotating in the same rotating direction as the sun gear 351 by a friction force between the friction surface 351a of the sun gear 351 and the friction surface of the bush 354. By the rotating force, the rotating link 353 is converted into a rotating force direction (that is, direction rotating based on the rotating shaft part 353a) by the bush protrusion 354a assembled with the protrusion insertion groove 353c and rotates.

That is, a sliding friction force between the friction surface of the bush 354 and the friction surface 351a of the sun gear 351 which is generated by a pressing force of the spring member 355 depending on the rotation direction of the sun gear 351 directly supplied with the rotating power of the power motor 360 rotates the bush 354. Next, the rotating force of the bush 354 is transferred to the rotating link 353 in which the relative rotating motion with the bush 354 is restricted. The rotating force of the rotating link 353 is transferred to the planetary gear 353 which is positioned at the gear shaft part 353b of the rotating link 353 and thus the planetary gear 352 is selectively geared with the second driven gear 341 of the gear train 340 for transferring and the first driven gear 331 of the gear train 330 for cutting, to implement the power conversion.

Further, when the two bushes 354 are inserted between the rotating shaft part 353a of the rotating link 353 and the sun gear 351 by forming a pair while facing each other and are assembled to allow the friction surface 351a of the sun gear 351 and the friction surface of the bush 354 to perform the relative sliding motion, the two bushes may be configured to constantly maintain a friction force even in the long-term use by applying a lubricant on the sliding friction surface for the smooth motion. Therefore, the present disclosure provides a structure in which the rotating link 353 transfers a rotating force in the same rotation direction as the rotating direction of the power motor 360 by the sun gear 351 to minimize the RPM of the motor required for the power conversion.

In addition, the power converter 350 according to the exemplary embodiment of the present disclosure having the configuration as described above is repeatedly used over the long period of time, and thus even when the power converter 350 is worn due to the friction between the sun gear 351 and the rotating shaft part 353a of the rotating link 353, as the adhesion due to the friction force of the bush 354 and the adhesion of the spring member 355 is improved (or constantly maintained), a slip phenomenon is prevented from occurring at the friction surface during the power conversion, thereby minimizing the conversion loss of the power converter 351 and the effect of the friction and the self load thereof.

Figure 13:
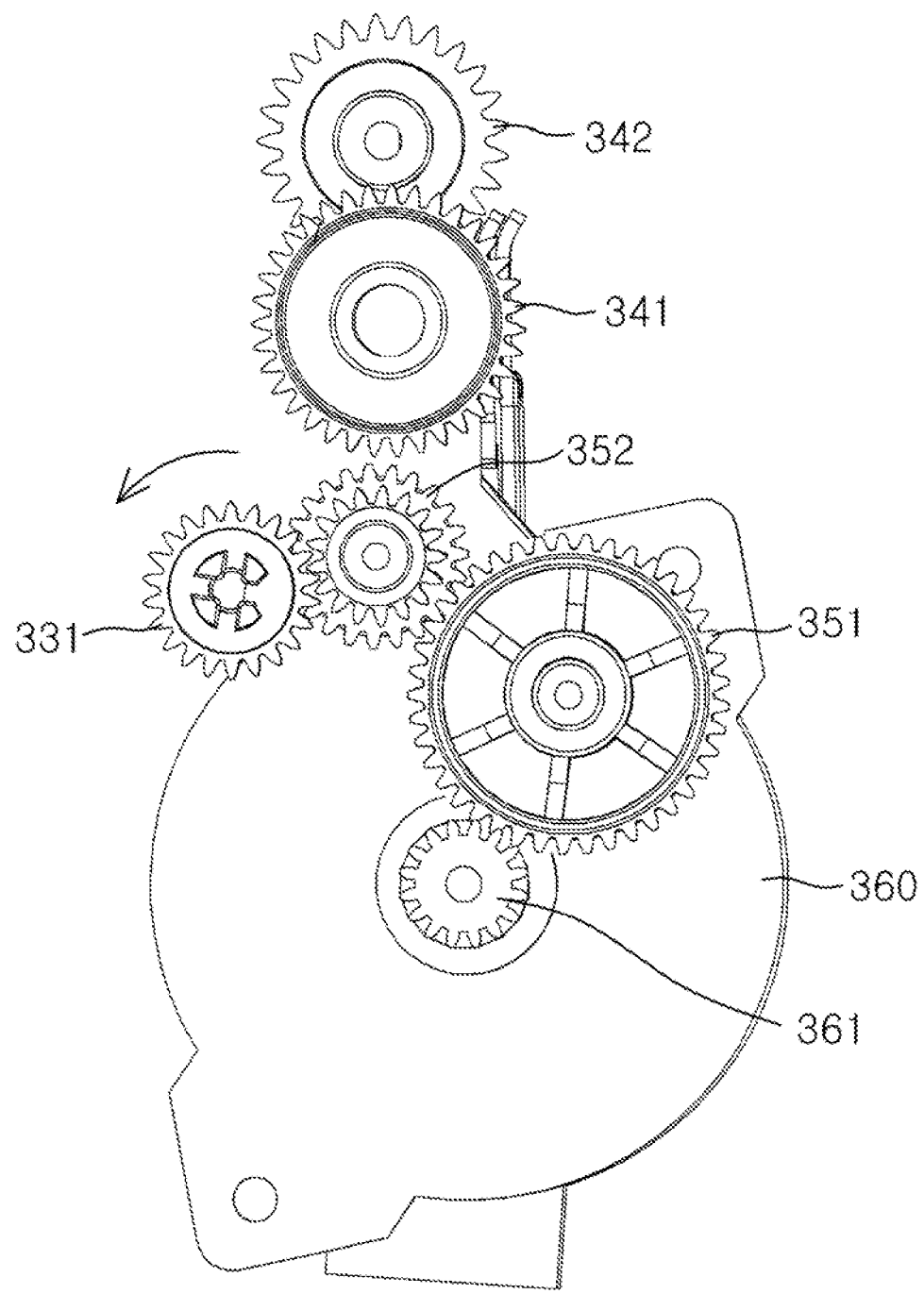
FIG. 13 is an operation state diagram illustrating a state in which the planetary gear of the power converter according to the first exemplary embodiment of the present disclosure is engaged with a first driven gear of the gear train for cutting.
Figure 14:
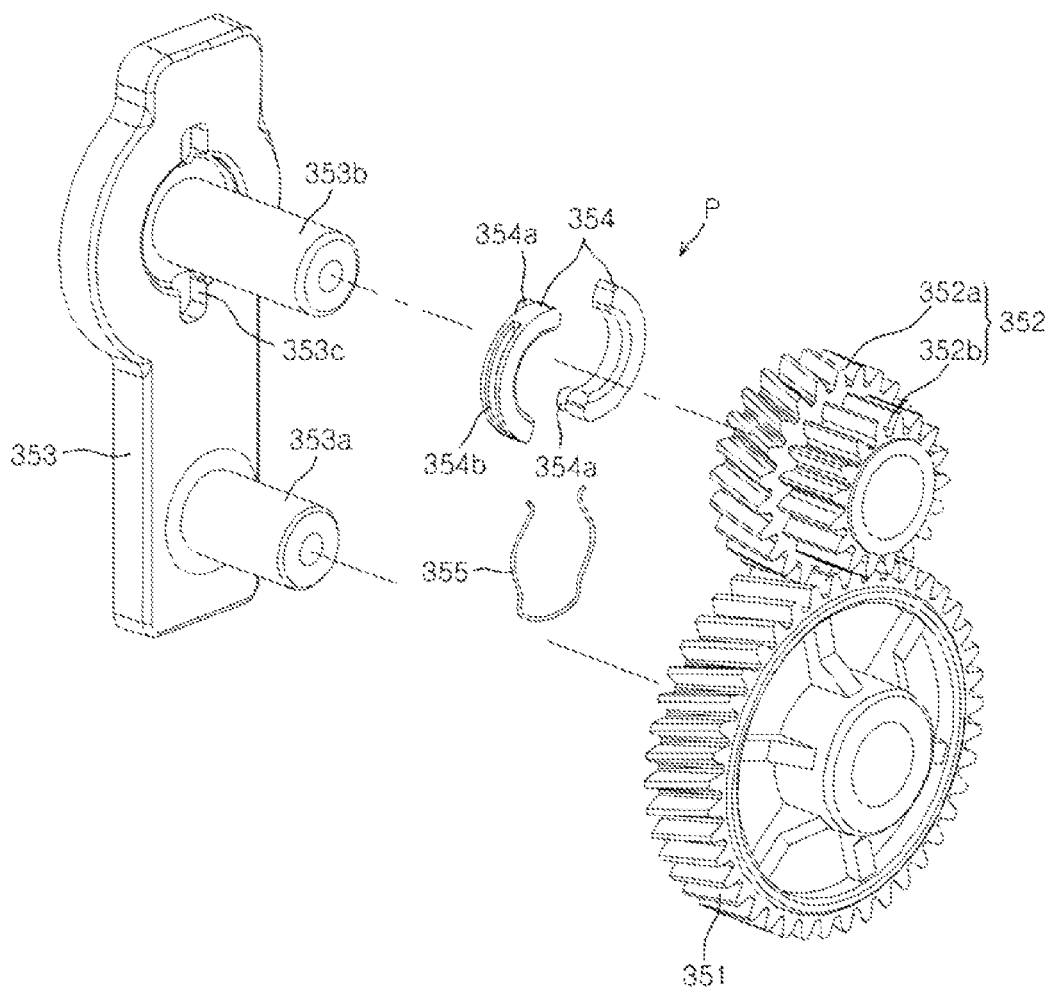
FIGS. 14 and 15 are exploded perspective views illustrating a state in which a pressing means is disposed in the planetary gear, as another exemplary embodiment of the pressing means which is disposed in the power converter according to the first exemplary embodiment of the present disclosure.

As illustrated in FIGS. 13 and 14, the pressing means P is disposed between the planetary gear 352 and the gear shaft part 353b of the rotating link 353 and may also be implemented in a direction which increases the adhesion. That is, even in the case of firmly holding between the planetary gear 352 and the gear shaft part 353b during the power conversion, it is possible to obtain an effect like holding the sun gear 351 and the rotating shaft part 353a. However, a detailed description of the structure in which the pressing means P is inserted between the planetary gear 352 and the gear shaft part 353b will be omitted. The structure in which the pressing means P is inserted between the planetary gear 352 and the gear shaft part 353b is illustrated in FIGS. 13 and 14. Similarly thereto, the structure in which the pressing means P is inserted between the sun gear 351 and the rotating shaft part 353a is already described and therefore even though the detailed description of the structure in which the pressing means P is disposed between the planetary gear 352 and the gear shaft part 353b is omitted, it may be sufficiently understood by those skilled in the art.

Figure 15:
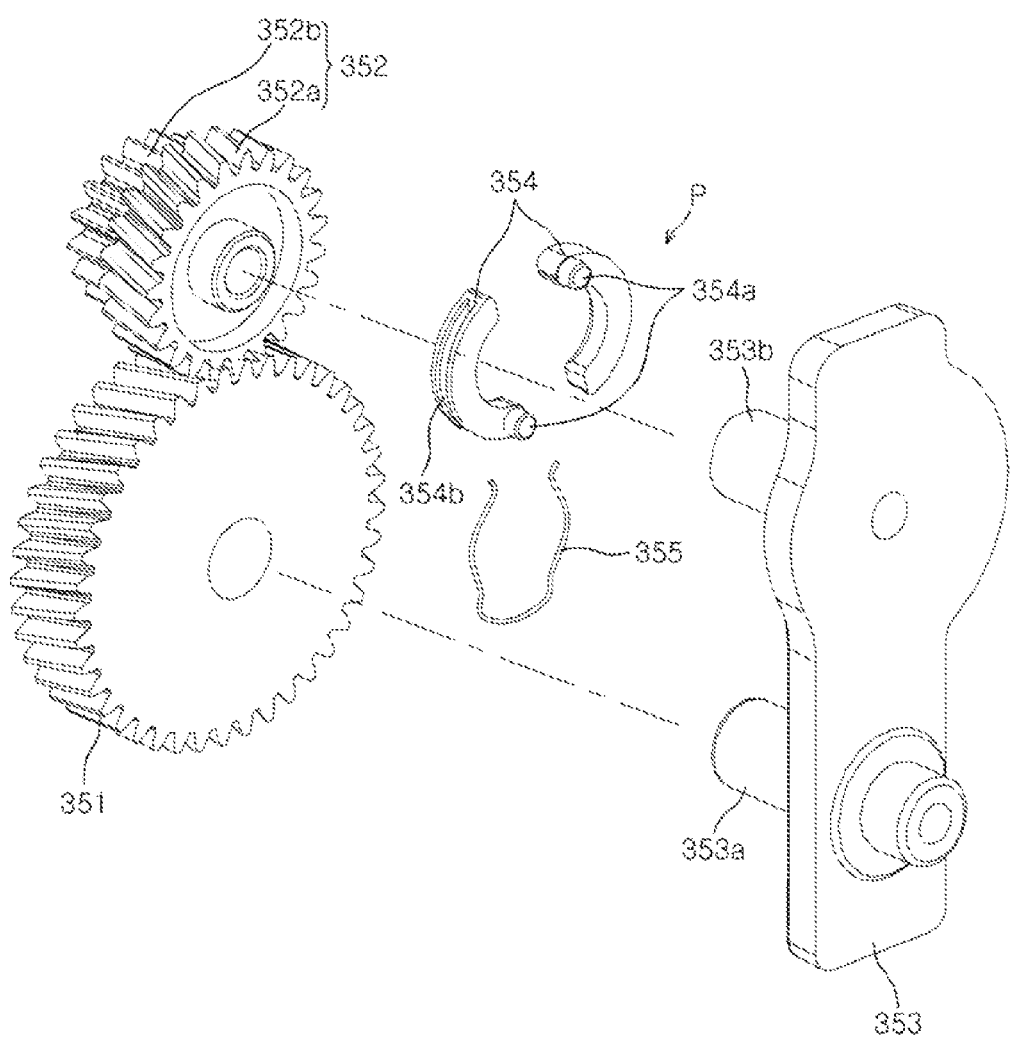
Figure 16:
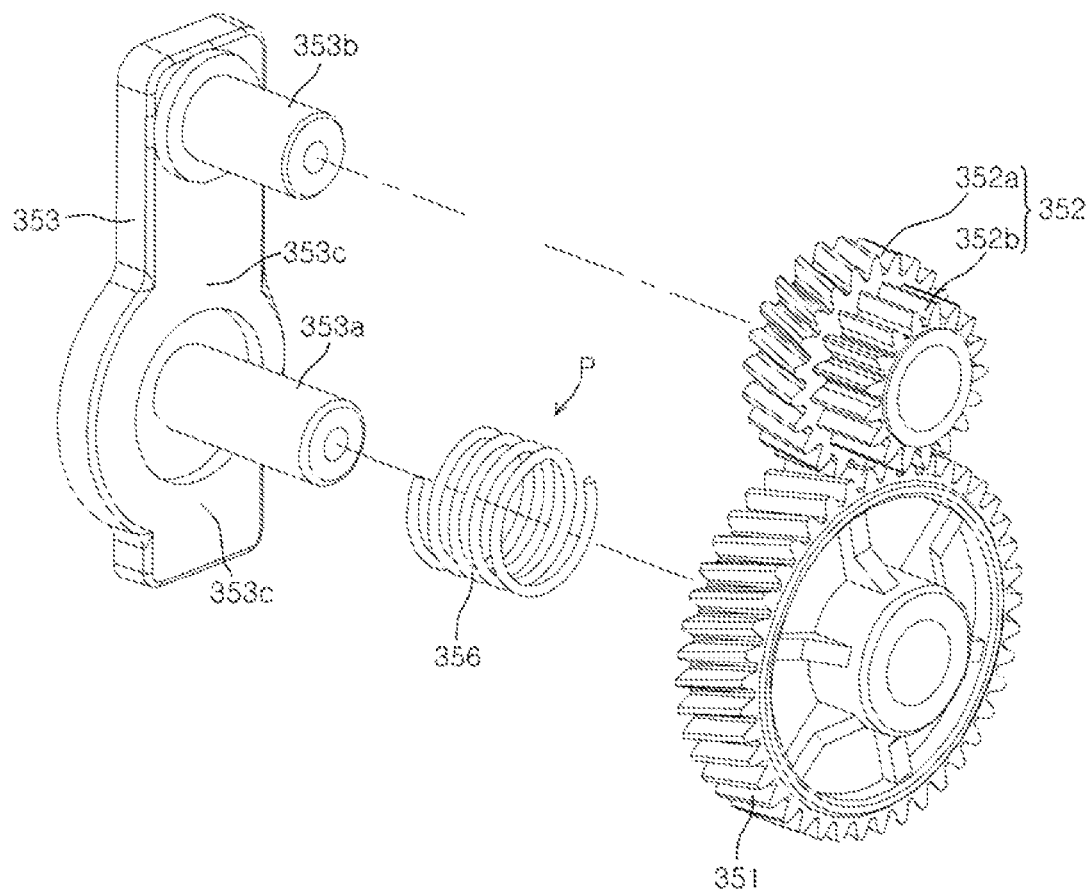
FIG. 16 is an exploded perspective view illustrating a structure in which the pressing means having a coil spring form is disposed in a sun gear of the power converter according to the first exemplary embodiment of the present disclosure.

Further, as illustrated in FIGS. 15 and 16, according to an exemplary embodiment of the present disclosure, the pressing means P may be configured of a pressing member 356 in a coil spring form which is fitted between the sun gear 351 and the rotating shaft part 353a of the rotating link 353 and may be configured of a pressing member 356 in a coil spring form which is fitted between the planetary gear 352 and the gear shaft part 353b of the rotating link 353. The pressing member 356 in the coil spring form may also prevent the slip phenomenon from occurring during the power conversion by functionally increasing the adhesion between the sung gear 351 and the rotating shaft part 353a or the planetary gear 352 and the gear shaft part 353b.

Figure 17:
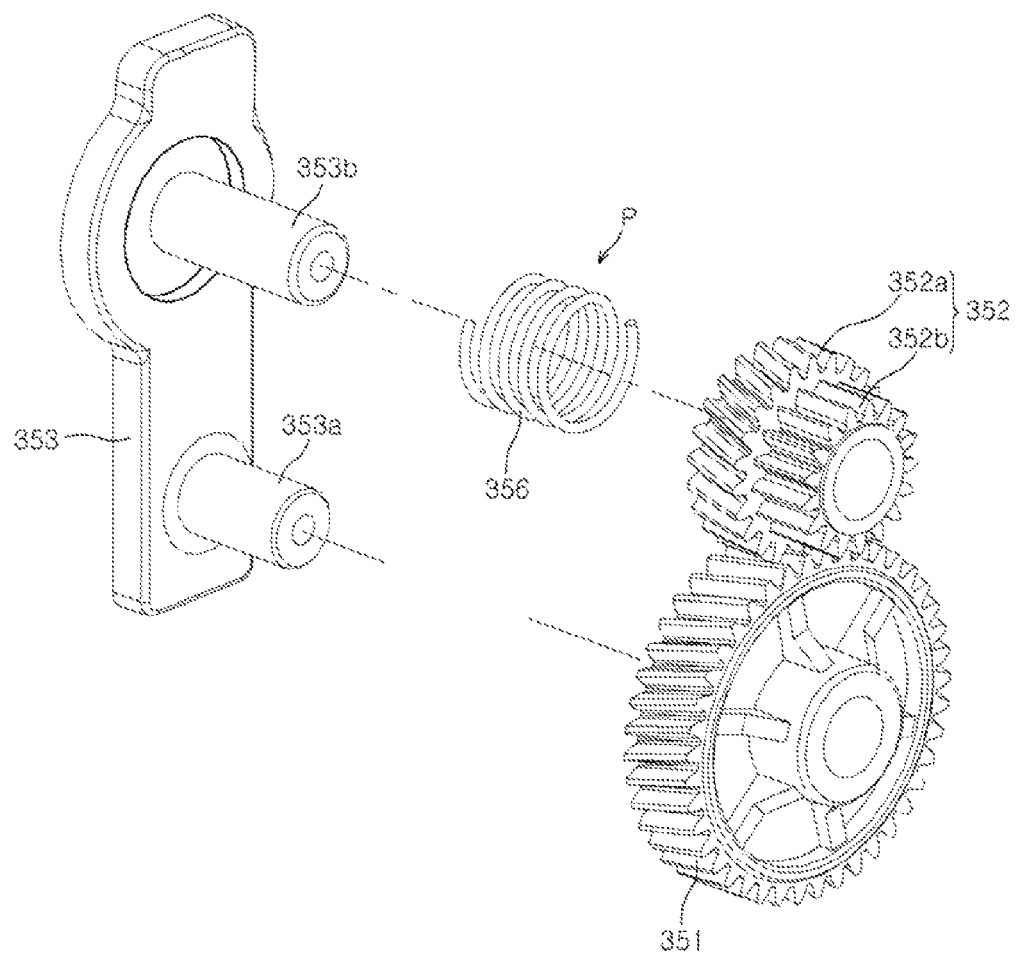
FIG. 17 is an exploded perspective view illustrating the structure in which the pressing means in the coil spring form is disposed in the planetary gear of the power converter according to the first exemplary embodiment of the present disclosure.
Figure 18:
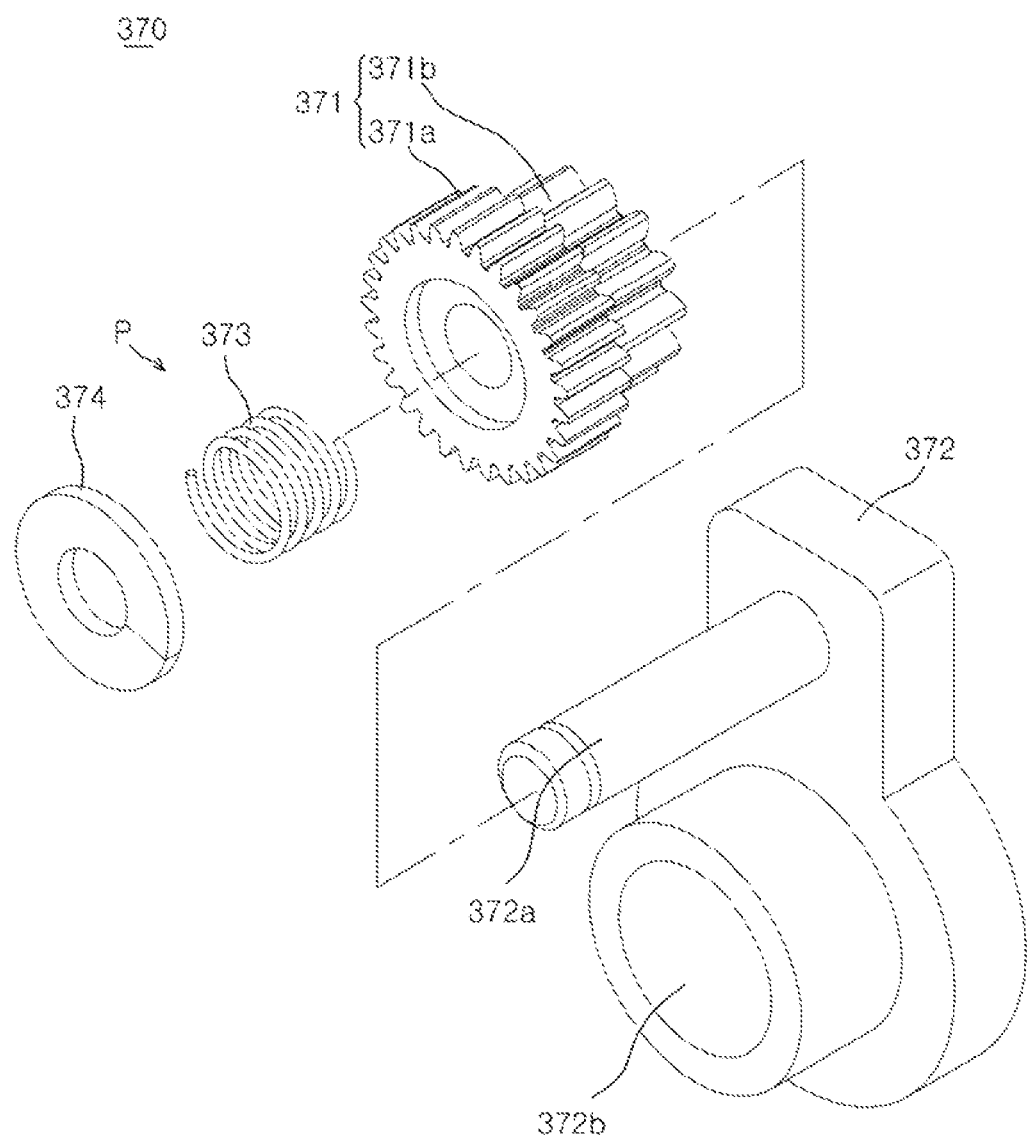
FIGS. 18 to 19 are exploded perspective view and a coupled perspective view of main parts illustrating a configuration of a power converter according to a second exemplary embodiment of the present disclosure.

Meanwhile, the power converter according to another exemplary embodiment of the present disclosure is illustrated in FIGS. 17 and 18. The power converter 370 according to the second exemplary embodiment of the present disclosure may be preferably applied when products are configured in a small size. In describing the power converter 370 according to the second exemplary embodiment of the present disclosure, the gear train of the gear train 330 for cutting and the gear train 340 for transferring which transfer power while being engaged with the power converter 370 is identically applied the configuration description of the above first exemplary embodiment of the present disclosure and therefore the detailed description thereof will be omitted.

As illustrated in FIGS. 17 to 20, the power converter 370 according to the second exemplary embodiment of the present disclosure is configured to include a power conversion gear 371 and a rotating link 372. The power conversion gear 371 has a geared structure in which a large gear 371a engaged with the driving gear 361 of the power motor 360 and a small gear 371b selectively engaged with the first driven gear 331 of the gear train 330 for cutting and the second driven gear 341 of the gear train 340 for transferring are integrally formed.

Further, the rotating link 372 is configured to include a gear shaft part 372a which may be fitted with the power conversion gear 371 and a central shaft part 372b which may be aligned based on a driving shaft of the power motor 360. Therefore, the rotating link 372 for power conversion is aligned based on the driving shaft of the power motor 360 and has a structure in which the large gear 371a of the power conversion gear 371 is engaged with the driving gear 361 of the power motor 360 in the state in which the power conversion gear 371 is fitted in the gear shaft part 372a. In this case, a pressing member 373 in a coil spring form is inserted into an assembled portion of the gear shaft part 372a of the rotating link 372 and the power conversion gear 371 to increase the adhesion between the power conversion gear 371 and the rotating link 372. Further, an end of the gear shaft part 372a is assembled with a washer 374 for preventing the pressing member 373 from separating.

Figure 19:
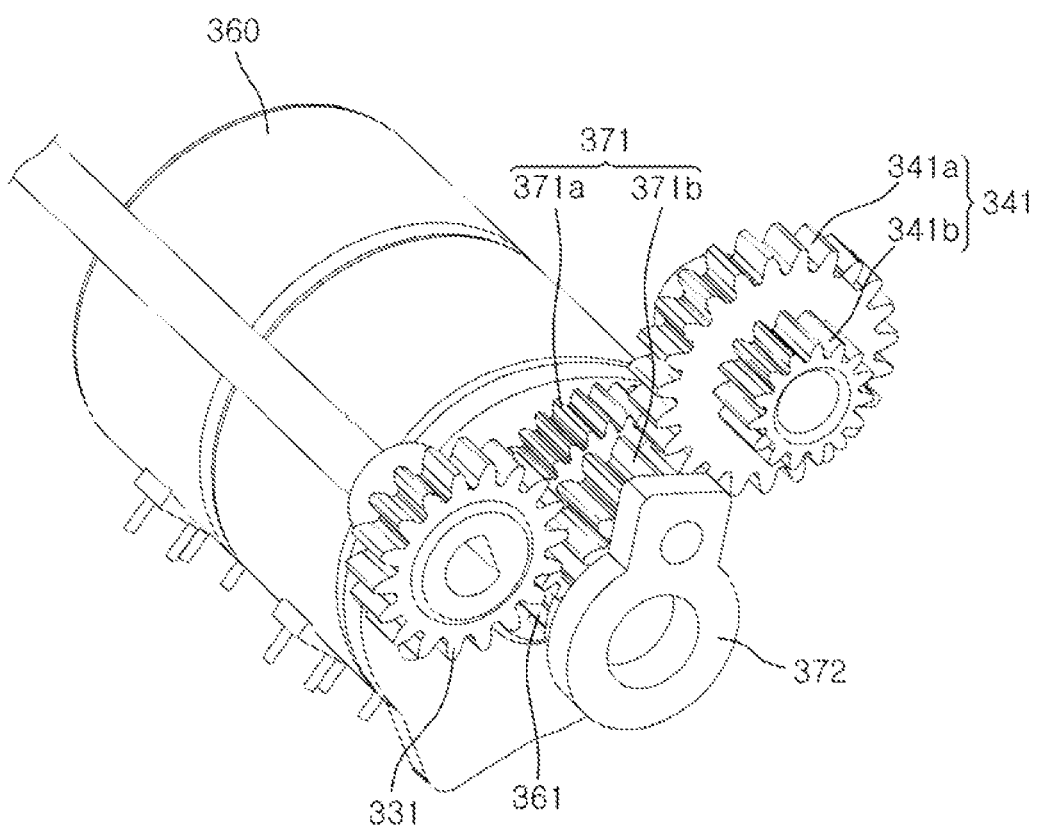
Figure 20:
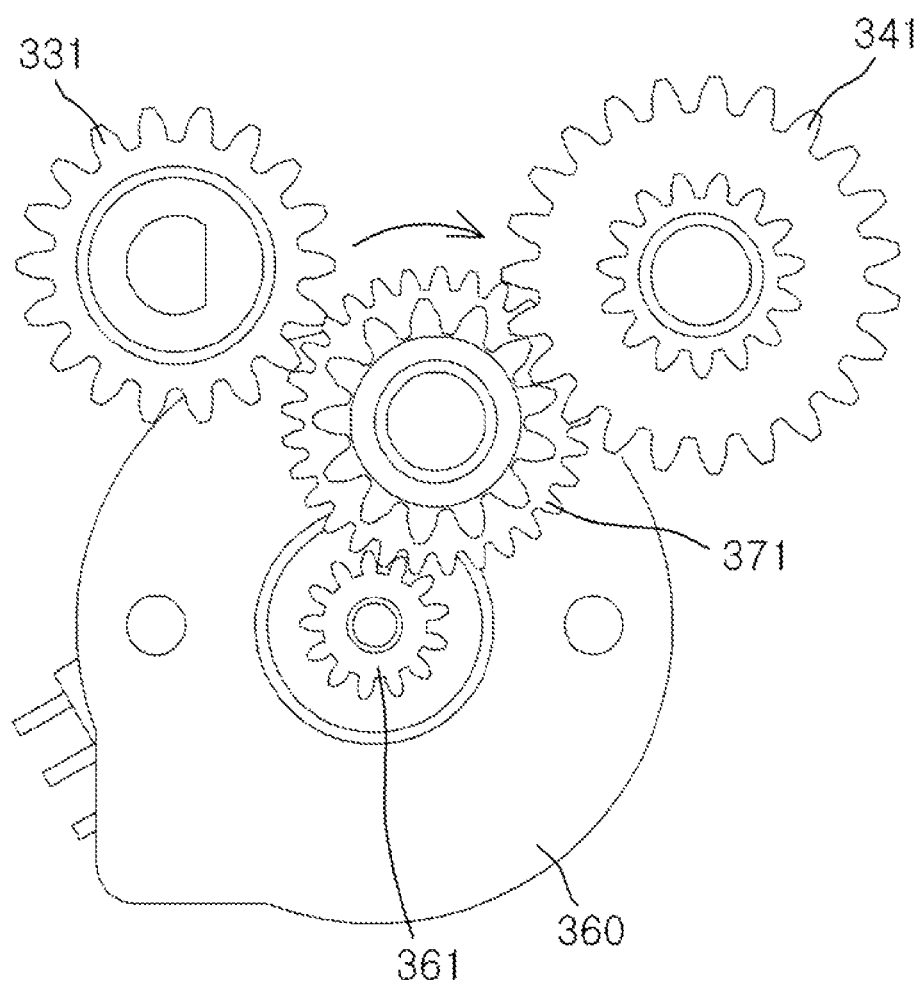
FIG. 20 is an operation state diagram illustrating a state in which a power conversion gear of the power converter according to the second exemplary embodiment of the present disclosure is engaged with the second driven gear of the gear train for transferring.
Figure 21:
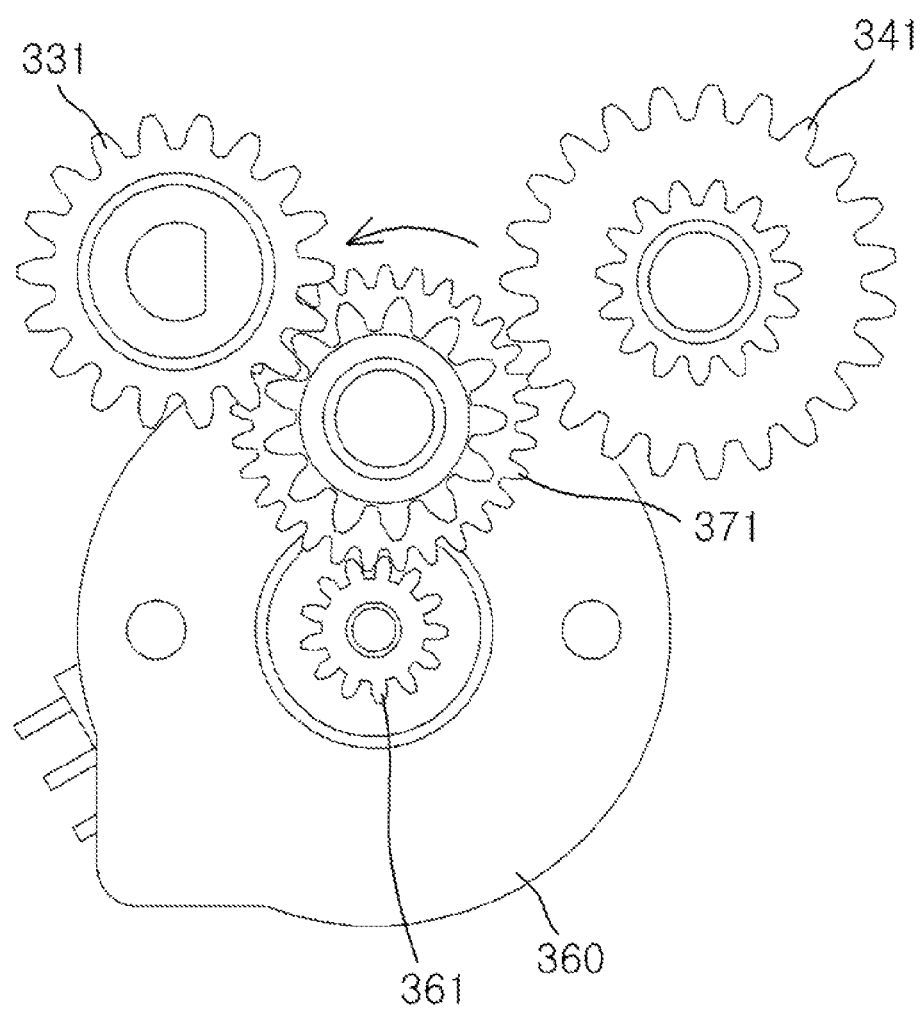
FIG. 21 is an operation state diagram illustrating a state in which a power conversion gear of a power converter according to the second exemplary embodiment of the present disclosure is engaged with a first driven gear of a gear train for cutting.

In the case of using the power converter 370 according to the second exemplary embodiment of the present disclosure, the large gear 371a of the power conversion gear 371 is engaged with the driving gear 361 of the power motor 360 and the central shaft part 372b of the rotating link 372 is aligned at the driving shaft of the power motor 360, and as a result, the power conversion gear 371 rotates forward or reversely depending on the rotation direction of the power motor 360. As the rotating link 372 rotates based on the central shaft part 372b depending on the forward rotation direction or the reverse rotation direction of the power conversion gear 371, the position of the small gear 371b of the power conversion gear 371 is naturally changed. Therefore, as illustrated in FIGS. 19 and 20, the position of the small gear 371b moves and thus a power transfer direction is converted while being selectively geared the first driven gear 331 of the gear train 330 for cutting and the second driven gear 341 of the gear train 340 for transferring, respectively.

As such, the configuration of the power converter 370 according to the second exemplary embodiment of the present disclosure is relatively more simplified than that of the power converter 350 according to the first exemplary embodiment of the present disclosure and the power converter 370 increases the adhesion by the pressing member 373 to prevent the slip phenomenon from occurring at the friction surface of the power conversion gear 371 and the rotating link 372 during the power conversion and be structurally simplified, such that the power converter 370 may be applied to small-sized products.

As described above, according to the exemplary embodiments of the present disclosure, it is possible to minimizing the conversion loss of the power converter at the time of selectively converting power into the gear train for transferring print paper and the gear train for cutting printed paper depending on the rotation direction of the power motor, in performing the operation of transferring print paper of the printer and the operation of cutting printed paper of the printer using one power motor, thereby implementing the fast power conversion. According to the exemplary embodiments, it is possible to minimize the effect of the friction and the self load of the power converter and minimize the deviation in the RPM of the motor required for the power conversion due to the effect of the friction, etc., of parts depending on the long-term use of the power converter, thereby securing the reliability of products.

According to the exemplary embodiments of the present disclosure, it is possible to remarkably reduce the time taken to cut the printed paper by integrating the motor for cutting and the motor for transferring into one to replace the motor for cutting with the motor for transferring in the case of using the single power motor, thereby remarkably reducing the time taken to cut the printed paper.

Hereinabove, the exemplary embodiments of the present disclosure are illustrated and described, but the present disclosure is not limited to the above-mentioned specific exemplary embodiment and may be variously modified by those skilled in the art to which the present disclosure pertains without departing from the gist of the present disclosure as defined by the following claims. In addition, these modifications are to fall within the scope of the following claims.

What is claimed is:

1. A power conversion apparatus for a printer including a body casing, a cover frame, a printer head unit including a gear train for transferring print paper, a gear train for cutting printed paper, and a cutter for cutting printed paper, and a platen roller unit, the power conversion apparatus comprising:
    a power motor; and
    a power converter configured to selectively convert rotation power of the power motor into the gear train for transferring and the gear train for cutting, respectively, depending on a rotation direction of the power motor, the power converter comprising:
    a sun gear configured to receive power from the power motor;
    a planetary gear configured to receive a rotating force while being engaged with the sun gear and to selectively couple with the gear train for cutting and the gear train for transferring, respectively;
    a rotating link configured to constrain a position of the planetary gear; and
    a pressing means configured to increase an adhesion between the sun gear and the rotating link.

2. The power conversion apparatus for a printer of claim 1, wherein the rotating link of the power converter is protrudedly formed with a rotating shaft part coupled with the sun gear and a gear shaft part coupled with the planetary gear.

3. The power conversion apparatus for a printer of claim 2, wherein the pressing means is inserted between the sun gear and the rotating shaft part of the rotating link.

4. The power conversion apparatus of claim 3, wherein the pressing means comprises:
    semi-arch shaped bushes formed in a pair to face each other and the semi-arch shaped bushes configured to be inserted between the rotating shaft part of the rotating link and the sun gear; and
    a spring member configured to be mounted in a long-hole concave groove formed on an outer circumferential surface of the bushes.

5. The power conversion apparatus of claim 4, wherein the pressing means further comprises:
    a bush protrusion formed at one end of the bushes to be inserted into a protrusion insertion groove formed on the rotating link.

6. The power conversion apparatus for a printer of claim 2, wherein the pressing means is inserted between the planetary gear and the gear shaft part of the rotating link.

7. The power conversion apparatus of claim 6, wherein the pressing means comprises:
    semi-arch shaped bushes formed in a pair to face each other and the semi-arc shaped bushes configured to be inserted between the gear shaft part of the rotating link and the planetary gear; and
    a spring member configured to be mounted in a long-hole concave groove formed on an outer circumferential surface of the bushes.

8. The power conversion apparatus of claim 7, wherein the pressing means further comprises: a bush protrusion formed at one end of the bushes and the bush protrusion configured to be inserted into a protrusion insertion groove formed on the rotating link.

9. The power conversion apparatus of claim 2, wherein the pressing means is a pressing member having a coil spring form.

10. The power conversion apparatus of claim 2, wherein the gear train for cutting comprises:
    a first driven gear configured to be disposed on one side of a support frame so as to be engaged with the planetary gear;
    a bevel gear comprising a ring gear forming a pair with a pinion gear disposed at the other end of a driven shaft, wherein the driven shaft is connected to the first driven gear and is horizontally disposed at a central portion inside the support frame; and
    a crank gear configured to be geared with the ring gear of the bevel gear and connected to an operating guide by which an operating blade of the cutter for cutting printed paper slidably moves up and down.

11. The power conversion apparatus of claim 10, wherein the gear train for transferring comprises:
    a second driven gear configured to be engaged with the planetary gear by moving a position of the planetary gear based on the sun gear; and
    a platen gear configured to be disposed at one end of a platen roller while being engaged with the second driven gear.

12. The power conversion apparatus of claim 11, wherein the cutter for cutting printed paper comprises:
    an operating blade configured to slidably move up and down while being supported by and fixed to an operating guide which is mounted to slidably move up and down in response to a driving force of the power motor through the gear train for cutting inside the support frame; and
    a fixed blade configured to be vertically supported and fixed on a whole surface of the platen roller unit so as to cut the printed paper in a cross cooperation with the operation blade slidably moving up and down.

13. The power conversion apparatus of claim 12, wherein the planetary gear comprises:
    a first large gear configured to be engaged with the sun gear; and
    a first small gear configured to be selectively engaged with the first driven gear and the second driven gear.

14. The power conversion apparatus of claim 13, wherein the power conversion gear of the power converter comprises a gear structure with a second large gear engaged with a driving gear of the power motor and a second small gear selectively engaged with the first driven gear of the gear train for cutting and the second driven gear of the gear train for transferring.

15. The power conversion apparatus of claim 14, wherein the power converter further comprises:
 a washer configured to be installed at an end of the gear shaft part to prevent the pressing member from separating.

16. A power conversion apparatus for a printer including a body casing, a cover frame, a printer head unit including a gear train for transferring print paper, a gear train for cutting printed paper, and a cutter for cutting printed paper, and a platen roller unit, the power conversion apparatus comprising:
 a power motor; and
 a power converter configured to selectively convert rotation power of the power motor into the gear train for transferring and the gear train for cutting, respectively, depending on a rotation direction of the power motor, the power converter comprising:
 a sun gear configured to receive power from the power motor;
 a planetary gear configured to receive a rotating force while being engaged with the sun gear and to selectively couple with the gear train for cutting and the gear train for transferring, respectively;
 a rotating link configured to constrain a position of the planetary gear; and
 a pressing means configured to increase an adhesion between the planetary gear and the rotating link.

17. A power conversion apparatus for a printer including a body casing, a cover frame, a printer head unit including a gear train for transferring print paper, a gear train for cutting printed paper, and a cutter for cutting printed paper, and a platen roller unit, the power conversion apparatus comprising:
 a power motor;
 a first power converter configured to selectively convert rotation power of the power motor into the gear train for transferring and the gear train for cutting, respectively, depending on a rotation direction of the power motor; and
 a second power converter configured to selectively convert rotation power of the power motor into the gear train for transferring and the gear train for cutting, respectively, depending on a rotation direction of the power motor,
 wherein the second power converter comprising:
 a power conversion gear;
 a rotating link comprising a gear shaft part fitted with the power conversion gear and a central shaft part aligned based on a driving shaft of the power motor; and
 a pressing member configured to be inserted into an assembled portion of the gear shaft part of the rotating link and the power conversion gear.

18. The power conversion apparatus of claim 17, wherein the gear train for cutting comprises:
 a first driven gear configured to be disposed on one side of a support frame so as to be engaged with the planetary gear;
 a bevel gear comprising a ring gear forming a pair with a pinion gear disposed at the other end of a driven shaft, wherein the driven shaft is connected to the first driven gear and is horizontally disposed at a central portion inside the support frame; and
 a crank gear configured to be geared with the ring gear of the bevel gear and connected to an operating guide by which an operating blade of the cutter for cutting printed paper slidably moves up and down.

19. The power conversion apparatus of claim 18, wherein the gear train for transferring comprises:
 a second driven gear configured to be engaged with the planetary gear by moving a position of the planetary gear based on the sun gear; and
 a platen gear disposed at one end of a platen roller while being engaged with the second driven gear.

20. The power conversion apparatus of claim 19, wherein the cutter for cutting printed paper comprises:
 an operating blade configured to slidably move up and down while being supported by and fixed to an operating guide which is mounted to slidably move up and down in response to a driving force of the power motor through the gear train for cutting inside the support frame; and
 a fixed blade configured to be vertically supported and fixed on a whole surface of the platen roller unit so as to cut the printed paper in a cross cooperation with the operation blade slidably moving.

\* \* \* \* \*